(12) United States Patent
Licona

(10) Patent No.: US 12,518,621 B2
(45) Date of Patent: Jan. 6, 2026

(54) ROADSIDE ASSISTANCE SYSTEM AND METHOD

(71) Applicant: Carlos David Licona, Austin, TX (US)

(72) Inventor: Carlos David Licona, Austin, TX (US)

(73) Assignee: Carlos David Licona, Austin, TX (US)

( * ) Notice: Subject to any disclaimer, the term of this patent is extended or adjusted under 35 U.S.C. 154(b) by 0 days.

(21) Appl. No.: 18/905,599

(22) Filed: Oct. 3, 2024

(65) Prior Publication Data

US 2025/0111708 A1    Apr. 3, 2025

Related U.S. Application Data

(60) Provisional application No. 63/587,594, filed on Oct. 3, 2023.

(51) Int. Cl.
| | |
|---|---|
| *G08G 1/01* | (2006.01) |
| *G06Q 10/047* | (2023.01) |
| *G06Q 10/0631* | (2023.01) |
| *G06Q 10/20* | (2023.01) |
| *G06Q 30/0282* | (2023.01) |
| *G06Q 30/08* | (2012.01) |
| *G06Q 40/08* | (2012.01) |
| *G06Q 50/40* | (2024.01) |
| *G07C 5/00* | (2006.01) |

(Continued)

(52) U.S. Cl.
CPC ......... *G08G 1/0133* (2013.01); *G06Q 10/047* (2013.01); *G06Q 10/063112* (2013.01); *G06Q 10/20* (2013.01); *G06Q 30/0282* (2013.01); *G06Q 30/08* (2013.01); *G06Q 40/08* (2013.01); *G06Q 50/40* (2024.01); *G07C 5/008* (2013.01); *G07C 5/0808* (2013.01); *G07C 5/0816* (2013.01); *G07C 5/085* (2013.01); *G08B 25/00* (2013.01); *G08G 1/0967* (2013.01)

(58) Field of Classification Search
CPC ...... G07C 5/008; G07C 5/0816; G07C 5/085; G06Q 50/40
See application file for complete search history.

(56) References Cited

U.S. PATENT DOCUMENTS

| | | |
|---|---|---|
| 9,053,588 B1 | 6/2015 | Briggs et al. |
| 9,282,430 B1 | 3/2016 | Brandmaier et al. |

(Continued)

FOREIGN PATENT DOCUMENTS

| | | |
|---|---|---|
| WO | 2015/095235 A1 | 6/2015 |
| WO | 2020/060912 A1 | 3/2020 |

OTHER PUBLICATIONS

Cheryl Jensen. Special to the Tribune. (Feb. 26, 1998). At Your Service GM Expands Onstar Emergency System Beyond Cadillac: [North Sports Final edition]. Chicago Tribune (Year: 1998).

(Continued)

*Primary Examiner* — Michael V Kerrigan
(74) *Attorney, Agent, or Firm* — Akerman LLP

(57) ABSTRACT

A method, computer program product, and computing system for storing instance information regarding a transportation instance of a vehicle; monitoring operation of the vehicle during the transportation instance to detect operation disruptions; detecting an operation disruption incident for the vehicle during the transportation instance; and providing one or more assistance providers with at least a portion of the instance information regarding a transportation instance.

30 Claims, 9 Drawing Sheets

(51) Int. Cl.
      *G07C 5/08*    (2006.01)
      *G08B 25/00*   (2006.01)
      *G08G 1/0967*  (2006.01)

(56) References Cited

U.S. PATENT DOCUMENTS

| | | |
|---|---|---|
| 9,520,006 B1 | 12/2016 | Sankovsky et al. |
| 9,672,719 B1 | 6/2017 | Hollenstain et al. |
| 10,124,757 B1 | 11/2018 | Kerr et al. |
| 10,317,240 B1 | 6/2019 | Di et al. |
| 10,943,463 B1 | 3/2021 | Clark |
| 11,012,667 B1 | 5/2021 | Nodder |
| 12,174,027 B2 | 12/2024 | Konrardy et al. |
| 12,175,433 B2 | 12/2024 | Lin et al. |
| 12,202,504 B2 | 1/2025 | Tong et al. |
| 2010/0256859 A1 | 10/2010 | Leyerle et al. |
| 2011/0224898 A1 | 9/2011 | Scofield et al. |
| 2014/0206308 A1 | 7/2014 | Hatton |
| 2014/0277888 A1 | 9/2014 | Dastoor et al. |
| 2014/0309853 A1 | 10/2014 | Ricci |
| 2014/0357295 A1 | 12/2014 | Skomra et al. |
| 2015/0324720 A1 | 11/2015 | Briggs et al. |
| 2016/0092962 A1 | 3/2016 | Wasserman et al. |
| 2016/0198306 A1 | 7/2016 | Miles et al. |
| 2016/0269883 A1* | 9/2016 | Eswaran ............ H04W 4/90 |
| 2017/0046216 A1 | 2/2017 | Stenneth |
| 2017/0210323 A1 | 7/2017 | Cordova et al. |
| 2018/0053401 A1 | 2/2018 | Martin et al. |
| 2018/0268305 A1 | 9/2018 | Dhondse et al. |
| 2018/0309592 A1 | 10/2018 | Stolfus |
| 2019/0243026 A1 | 8/2019 | Houchens et al. |
| 2019/0392367 A1 | 12/2019 | Gara et al. |
| 2020/0037141 A1* | 1/2020 | Hirata ............... G07C 5/008 |
| 2020/0118444 A1 | 4/2020 | Wen et al. |
| 2020/0184591 A1 | 6/2020 | Balu et al. |
| 2020/0234515 A1 | 7/2020 | Gronsbell et al. |
| 2020/0334928 A1* | 10/2020 | Bourke ............... G06N 5/04 |
| 2020/0365034 A1 | 11/2020 | Barth et al. |
| 2021/0026918 A1 | 1/2021 | Axelrod |
| 2021/0133906 A1 | 5/2021 | Lota |
| 2021/0197702 A1 | 7/2021 | Krishnamurthi |
| 2021/0272183 A1 | 9/2021 | Turnbull et al. |
| 2022/0051156 A1 | 2/2022 | Kumar et al. |
| 2022/0065643 A1 | 3/2022 | Madineni et al. |
| 2022/0169287 A1 | 6/2022 | Beaurepaire et al. |
| 2022/0170752 A1 | 6/2022 | Beaurepaire et al. |
| 2022/0207446 A1 | 6/2022 | Fu et al. |
| 2022/0215755 A1 | 7/2022 | Broaddus et al. |
| 2022/0374908 A1 | 11/2022 | Faga et al. |
| 2022/0391564 A1 | 12/2022 | Zhang et al. |
| 2023/0022638 A1 | 1/2023 | Avrashi et al. |
| 2023/0053196 A1 | 2/2023 | Brandmaier et al. |
| 2023/0290188 A1 | 9/2023 | Neely et al. |
| 2024/0025294 A1 | 1/2024 | Treharne |
| 2024/0253651 A1 | 8/2024 | Mcnew et al. |
| 2024/0257146 A1 | 8/2024 | Valas et al. |
| 2024/0257166 A1 | 8/2024 | Valas et al. |
| 2025/0029026 A1 | 1/2025 | Telpaz et al. |
| 2025/0076881 A1 | 3/2025 | Nguyen et al. |
| 2025/0078587 A1 | 3/2025 | Desai et al. |
| 2025/0087095 A1 | 3/2025 | Wen et al. |

OTHER PUBLICATIONS

Lang, B. (Oct. 28, 2000). Smart Cars; GM's OnStar system growing in popularity: [SA edition]. The Post and Courier (Year: 2000).

Mzila, P., A Service Supplier Database for Location-Based Mobile Commerce, Jun. 1, 2007, 27th International Conference on Distributed Computing Systems Workshops (ICDCSW'07) (Year: 2007).

Non-Final Office Action issued in related U.S. Appl. No. 18/905,659 on Dec. 13, 2024.

Non-Final Office Action issued in related U.S. Appl. No. 18/905,676 on Dec. 20, 2024.

Non-Final Office Action issued in related U.S. Appl. No. 18/905,693 on Dec. 2, 2024.

Non-Final Office Action issued in related U.S. Appl. No. 18/905,723 on Dec. 5, 2024.

Non-Final Office Action issued in related U.S. Appl. No. 18/905,743 on Dec. 13, 2024.

Non-Final Office Action issued in related U.S. Appl. No. 18/905,785 on Dec. 3, 2024.

Owram, K. (Dec. 10, 2014). Towing startups take aim at CAA with GPS apps; 'ripe for revolution'. National Post (Year: 2014).

S. K. Datta and C. Bonnet, "An IoT framework for intelligent roadside assistance system," 2017 IEEE International Conference on Consumer Electronics—Taiwan (ICCE-TW), Taipei, Taiwan, 2017, pp. 353-354, doi: 10.1109/ICCE-China.2017.7991141. (Year: 2017).

Final Office Action issued in related U.S. Appl. No. 18/905,659 on Apr. 1, 2025.

Final Office Action issued in related U.S. Appl. No. 18/905,676 on Jun. 4, 2025.

Final Office Action issued in related U.S. Appl. No. 18/905,693 on Jun. 10, 2025.

Final Office Action issued in related U.S. Appl. No. 18/905,723 on Jul. 2, 2025.

Final Office Action issued in related U.S. Appl. No. 18/905,743 on Mar. 28, 2025.

Final Office Action issued in related U.S. Appl. No. 18/905,785 on Apr. 14, 2025.

Non-Final Office Action issued in related U.S. Appl. No. 18/905,723 on Mar. 20, 2025.

\* cited by examiner

ROADSIDE ASSISTANCE SYSTEM AND METHOD

RELATED APPLICATION

This application claims the benefit of U.S. Provisional Application No. 63/587,594, filed on 3 Oct. 2023, the entire contents of which are herein incorporated by reference.

TECHNICAL FIELD

This disclosure relates to roadside assistance systems and, more particularly, to commercial vehicle roadside assistance systems.

BACKGROUND

The history of towing commercial vehicles is closely tied to the development of transportation, commerce, and the regulatory framework surrounding roadside assistance services. Towing services became an essential part of transportation infrastructure, especially for the trucking and logistics industries, but the industry has also garnered criticism for overcharging, particularly in the realm of commercial vehicle towing. This overcharging stems from a variety of factors.

Towing services originated in the early 20th century, as automobiles became more common and breakdowns necessitated vehicle removal from roads. In 1916, Ernest Holmes Sr. invented the first towing truck, known as the "wrecker," in Chattanooga, Tennessee. His innovation enabled vehicles to be quickly cleared from dangerous or congested areas. As the commercial trucking industry expanded throughout the mid-20th century, the demand for heavy-duty towing increased. Specialized tow trucks, capable of handling large commercial vehicles like semi-trucks and buses, were developed. This allowed the towing industry to cater specifically to the needs of the logistics and transport industries.

By the 1980s and 1990s, the continued expansion of interstate commerce and long-haul trucking led to further growth in commercial vehicle towing. With this expansion, regulatory oversight was introduced to prevent traffic congestion and ensure the safe removal of large vehicles from highways. As the industry grew, trucking companies became increasingly reliant on towing services to handle accidents, breakdowns, and parking violations involving commercial vehicles.

Overcharging in commercial vehicle towing has become a major issue, largely due to a lack of standardized pricing and consistent regulation. Towing companies often charge exorbitant rates for emergency services, especially in situations where drivers or trucking companies have little choice but to accept the rates offered. The cost of towing a large commercial vehicle can vary widely, depending on factors such as location, the complexity of the recovery, and whether or not additional equipment is needed. Without standardized pricing, some companies exploit the situation by inflating costs for towing, storage, and administrative fees, leading to overcharges that can reach into the thousands of dollars. This practice is compounded by the fact that towing regulations differ from state to state, and in some regions, regulatory enforcement is minimal, leaving trucking companies vulnerable to price gouging.

SUMMARY OF DISCLOSURE

Concept 1—Providing Information to an Assistance Provider

In one implementation, a computer-implemented method is executed on a computing device and includes: storing instance information regarding a transportation instance of a vehicle; monitoring operation of the vehicle during the transportation instance to detect operation disruptions; detecting an operation disruption incident for the vehicle during the transportation instance; and providing one or more assistance providers with at least a portion of the instance information regarding a transportation instance.

One or more of the following features may be included. The instance information regarding the transportation instance of the vehicle may include one or more of: size information concerning the vehicle; type information concerning the vehicle; weight information concerning the vehicle; duration information for the transportation instance; velocity information for the vehicle during the transportation instance; current location information for the vehicle during the transportation instance; destination location information for the transportation instance; and starting location information for the transportation instance. The transportation instance may be all or a portion of a transportation route for the vehicle. The vehicle may be a commercial vehicle. Monitoring operation of the vehicle during the transportation instance to detect operation disruptions may include: monitoring the motion of the vehicle during the transportation instance. Monitoring operation of the vehicle during the transportation instance to detect operation disruptions may include: monitoring the acceleration/deceleration experienced by the vehicle during the transportation instance. The operation disruption incident may include a vehicle failure incident. The operation disruption incident may include a vehicle accident incident. The one or more assistance providers may include one or more roadside assistance providers. The one or more assistance providers may includes one or more emergency assistance providers In another implementation, a computer program product resides on a computer readable medium and has a plurality of instructions stored on it. When executed by a processor, the instructions cause the processor to perform operations including: storing instance information regarding a transportation instance of a vehicle; monitoring operation of the vehicle during the transportation instance to detect operation disruptions; detecting an operation disruption incident for the vehicle during the transportation instance; and providing one or more assistance providers with at least a portion of the instance information regarding a transportation instance.

One or more of the following features may be included. The instance information regarding the transportation instance of the vehicle may include one or more of: size information concerning the vehicle; type information concerning the vehicle; weight information concerning the vehicle; duration information for the transportation instance; velocity information for the vehicle during the transportation instance; current location information for the vehicle during the transportation instance; destination location information for the transportation instance; and starting location information for the transportation instance. The transportation instance may be all or a portion of a transportation route for the vehicle. The vehicle may be a commercial vehicle.

Monitoring operation of the vehicle during the transportation instance to detect operation disruptions may include: monitoring the motion of the vehicle during the transportation instance. Monitoring operation of the vehicle during the transportation instance to detect operation disruptions may include: monitoring the acceleration/deceleration experienced by the vehicle during the transportation instance. The operation disruption incident may include a vehicle failure incident. The operation disruption incident may include a vehicle accident incident. The one or more assistance providers may include one or more roadside assistance providers. The one or more assistance providers may includes one or more emergency assistance providers In another implementation, a computing system including a processor and memory is configured to perform operations including: storing instance information regarding a transportation instance of a vehicle; monitoring operation of the vehicle during the transportation instance to detect operation disruptions; detecting an operation disruption incident for the vehicle during the transportation instance; and providing one or more assistance providers with at least a portion of the instance information regarding a transportation instance.

One or more of the following features may be included. The instance information regarding the transportation instance of the vehicle may include one or more of: size information concerning the vehicle; type information concerning the vehicle; weight information concerning the vehicle; duration information for the transportation instance; velocity information for the vehicle during the transportation instance; current location information for the vehicle during the transportation instance; destination location information for the transportation instance; and starting location information for the transportation instance. The transportation instance may be all or a portion of a transportation route for the vehicle. The vehicle may be a commercial vehicle. Monitoring operation of the vehicle during the transportation instance to detect operation disruptions may include: monitoring the motion of the vehicle during the transportation instance. Monitoring operation of the vehicle during the transportation instance to detect operation disruptions may include: monitoring the acceleration/deceleration experienced by the vehicle during the transportation instance. The operation disruption incident may include a vehicle failure incident. The operation disruption incident may include a vehicle accident incident. The one or more assistance providers may include one or more roadside assistance providers. The one or more assistance providers may includes one or more emergency assistance providers The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION OF THE PREFERRED EMBODIMENTS

System Overview

Figure 1:
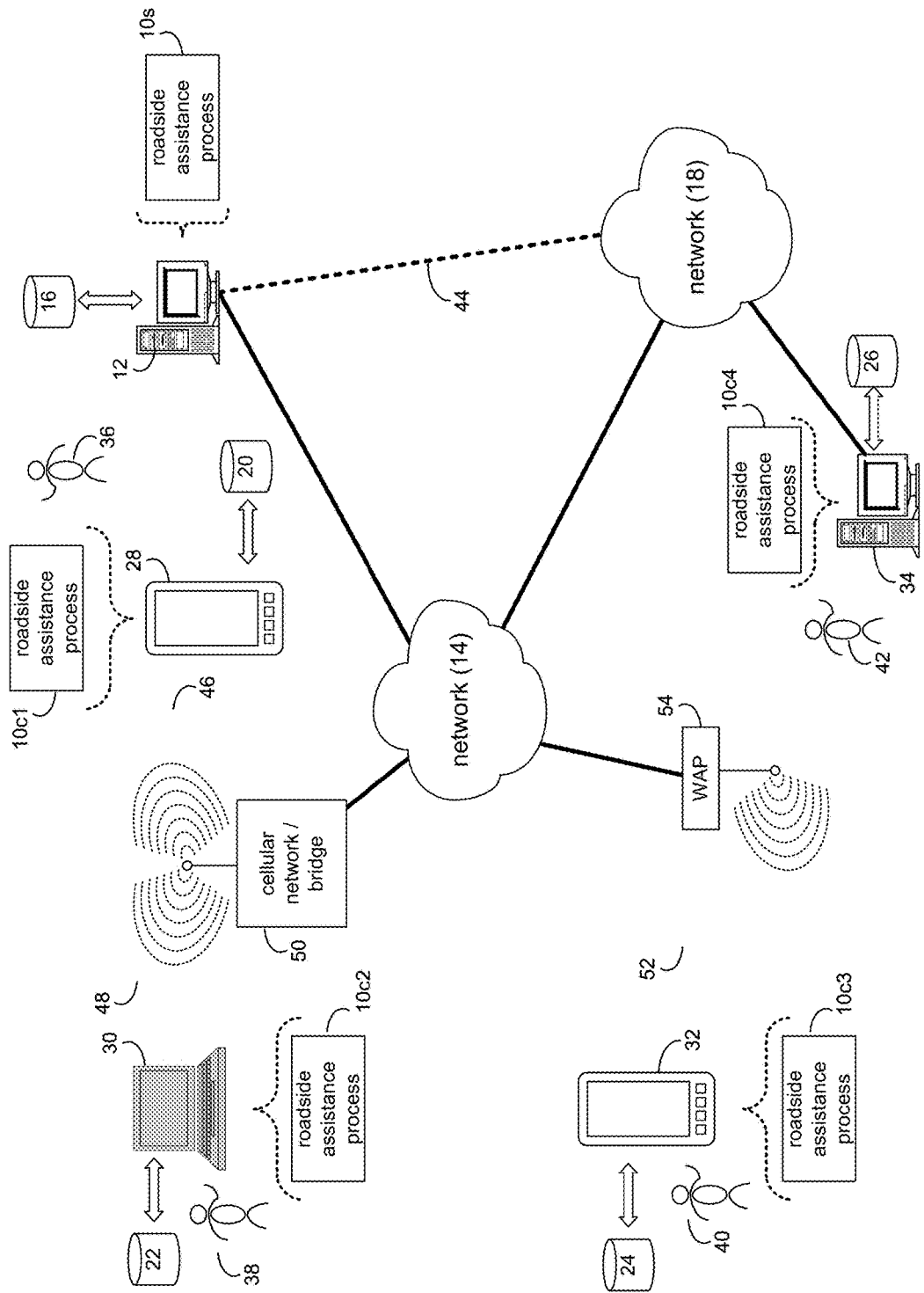
FIG. 1 is a diagrammatic view of a distributed computing network including a computing device that executes a roadside assistance process according to an implementation of the present disclosure.

Referring to FIG. 1, there is shown roadside assistance process 10. As will be discussed below in greater detail, roadside assistance process 10 may be utilized to provide assistance to drivers in the commercial vehicle space.

Roadside assistance process 10 may be implemented as a server-side process, a client-side process, or a hybrid server-side/client-side process. For example, roadside assistance process 10 may be implemented as a purely server-side process via roadside assistance process 10s. Alternatively, roadside assistance process 10 may be implemented as a purely client-side process via one or more of roadside assistance process 10c1, roadside assistance process 10c2, roadside assistance process 10c3, and roadside assistance process 10c4. Alternatively still, roadside assistance process 10 may be implemented as a hybrid server-side/client-side process via roadside assistance process 10s in combination with one or more of roadside assistance process 10c1, roadside assistance process 10c2, roadside assistance process 10c3, and roadside assistance process 10c4. Accordingly, roadside assistance process 10 as used in this disclosure may include any combination of roadside assistance process 10s, roadside assistance process 10c1, roadside assistance process 10c2, roadside assistance process 10c3, and roadside assistance process 10c4.

Roadside assistance process 10s may be a server application and may reside on and may be executed by computing device 12, which may be connected to network 14 (e.g., the Internet or a local area network). Examples of computing device 12 may include, but are not limited to: a personal computer, a laptop computer, a personal digital assistant, a data-enabled cellular telephone, a notebook computer, a television with one or more processors embedded therein or coupled thereto, a cable/satellite receiver with one or more processors embedded therein or coupled thereto, a server computer, a series of server computers, a mini computer, a mainframe computer, or a dedicated network device.

The instruction sets and subroutines of roadside assistance process 10s, which may be stored on storage device 16 coupled to computing device 12, may be executed by one or more processors (not shown) and one or more memory architectures (not shown) included within computing device 12. Examples of storage device 16 may include but are not limited to: a hard disk drive; a tape drive; an optical drive;

a RAID device; a random access memory (RAM); a read-only memory (ROM); and all forms of flash memory storage devices.

Network 14 may be connected to one or more secondary networks (e.g., network 18), examples of which may include but are not limited to: a local area network; a wide area network; or an intranet, for example.

Examples of roadside assistance processes 10c1, 10c2, 10c3, 10c4 may include but are not limited to a web browser, a game console user interface, or a specialized application (e.g., an application running on e.g., the Android™ platform or the iPhone™ platform). The instruction sets and subroutines of roadside assistance applications 10c1, 10c2, 10c3, 10c4, which may be stored on storage devices 20, 22, 24, 26 (respectively) coupled to client electronic devices 28, 30, 32, 34 (respectively), may be executed by one or more processors (not shown) and one or more memory architectures (not shown) incorporated into client electronic devices 28, 30, 32, 34 (respectively). Examples of storage devices 20, 22, 24, 26 may include but are not limited to: hard disk drives; tape drives; optical drives; RAID devices; random access memories (RAM); read-only memories (ROM), and all forms of flash memory storage devices.

Examples of client electronic devices 28, 30, 32, 34 may include, but are not limited to, data-enabled, cellular telephone 28, laptop computer 30, personal digital assistant 32, personal computer 34, a notebook computer (not shown), a server computer (not shown), a gaming console (not shown), a smart television (not shown), and a dedicated network device (not shown). Client electronic devices 28, 30, 32, 34 may each execute an operating system, examples of which may include but are not limited to Microsoft Windows™, Android™, WebOS™, iOS™, Redhat Linux™, or a custom operating system.

Users 36, 38, 40, 42 may access roadside assistance process 10 directly through network 14 or through secondary network 18. Further, roadside assistance process 10 may be connected to network 14 through secondary network 18, as illustrated with link line 44.

The various client electronic devices (e.g., client electronic devices 28, 30, 32, 34) may be directly or indirectly coupled to network 14 (or network 18). For example, data-enabled, cellular telephone 28 and laptop computer 30 are shown wirelessly coupled to network 14 via wireless communication channels 46, 48 (respectively) established between data-enabled, cellular telephone 28, laptop computer 30 (respectively) and cellular network/bridge 50, which is shown directly coupled to network 14. Further, personal digital assistant 32 is shown wirelessly coupled to network 14 via wireless communication channel 52 established between personal digital assistant 32 and wireless access point (i.e., WAP) 54, which is shown directly coupled to network 14. Additionally, personal computer 34 is shown directly coupled to network 18 via a hardwired network connection.

WAP 54 may be, for example, an IEEE 802.11a, 802.11b, 802.11g, 802.11n, Wi-Fi, and/or Bluetooth device that is capable of establishing wireless communication channel 52 between personal digital assistant 32 and WAP 54. As is known in the art, IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

Roadside Assistance Process (Overview)

Figure 2:
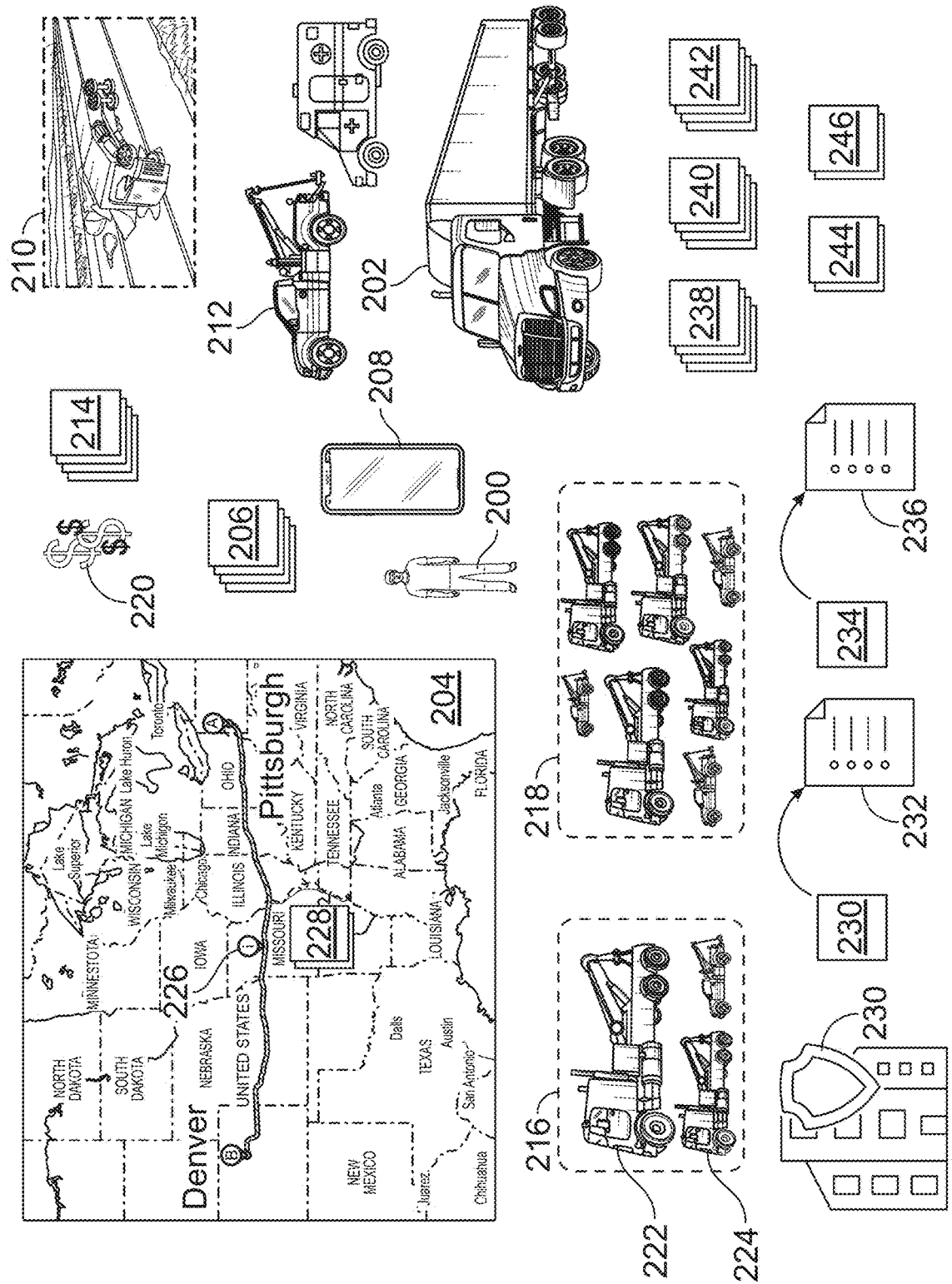
FIG. 2 is a diagrammatic view of a transportation instance monitored by the roadside assistance process of FIG. 1.

As discussed above and referring also to FIG. 2, roadside assistance process 10 may be utilized to provide assistance to drivers (e.g., driver 200) in the commercial vehicle space. Generally speaking, roadside assistance process 10 may monitor a vehicle (e.g., vehicle 202) during the course of a transportation instance (e.g., transportation instance 204) to determine the general condition of the trip.

The transportation instance (e.g., transportation instance 204) may be all or a portion of a transportation route for the vehicle (e.g., vehicle 202), wherein the vehicle (e.g., vehicle 202) may be a commercial vehicle (e.g., a tractor-trailer, a delivery van, a box truck, a tanker truck, a flatbed truck, etc.). For example, assume that the vehicle (e.g., vehicle 202) is a loaded tractor-trailer that is hauling a shipment of canned vegetables from Pittsburgh, Pennsylvania to Denver, Colorado. Accordingly, the transportation instance (e.g., transportation instance 204) may be all 1,447 miles of the trip from Pittsburgh PA to Denver, CO . . . or any portion thereof.

Roadside assistance process 10 may be of great importance to truck drivers (e.g., driver 200), who often travel alone and at off hours to avoid traffic. For example, roadside assistance process 10 may monitor the specific course being driven by the driver (e.g., driver 200) of the vehicle (e.g., vehicle 202) to determine whether or not e.g., the vehicle (e.g., vehicle 202) was involved in an accident, the vehicle (e.g., vehicle 202) is in need of roadside assistance, the driver (e.g., driver 200) is in need of a break/meal, the driver (e.g., driver 200) is in need of lodging, etc.

Applicability

While the following discussion concerns commercial vehicles and monitoring the same for the occurrence of an operation disruption, this is for illustrative purposes only and is not intended to be a limitation of this disclosure. Specifically, it is understood that the following discussions are equally applicable to non commercial vehicles, examples of which may include but are not limited to passenger cars, trucks and sport utility vehicles.

Therefore, while the following discussion and illustrative examples will concern the manner in which the operation of commercial vehicles are monitored so that assistance could be rendered (e.g., emergency personnel, roadside assistance) in the event of an operation disruption, it is understood that the same monitoring activities may be effectuated for non-commercial vehicles. For example, the monitoring of the motion of such a non-commercial vehicle may occur via one of more popular mobile applications (e.g., Apple Maps, Google Maps, Waze), via one or more OEM systems (e.g., in car OEM navigation systems), one or more aftermarket devices (e.g., a Garmin device, a Magellan device, a TomTom device), or a navigation application native to (incorporated within) roadside assistance process 10.

Accordingly, the following discussions concerning: Providing Information to an Assistance Provider, Prescreening Providers/Receiving Bids/Selecting a Provider, Selecting a Provider based on Geographical Information, Submitting Information to Liability Processor, Notifying Emergency Services, Generating and Updating Ranking of Providers, and Driver Recommendations are equally applicable to such non-commercial vehicles.

Concept 1—Providing Information to an Assistance Provider

Figure 3:
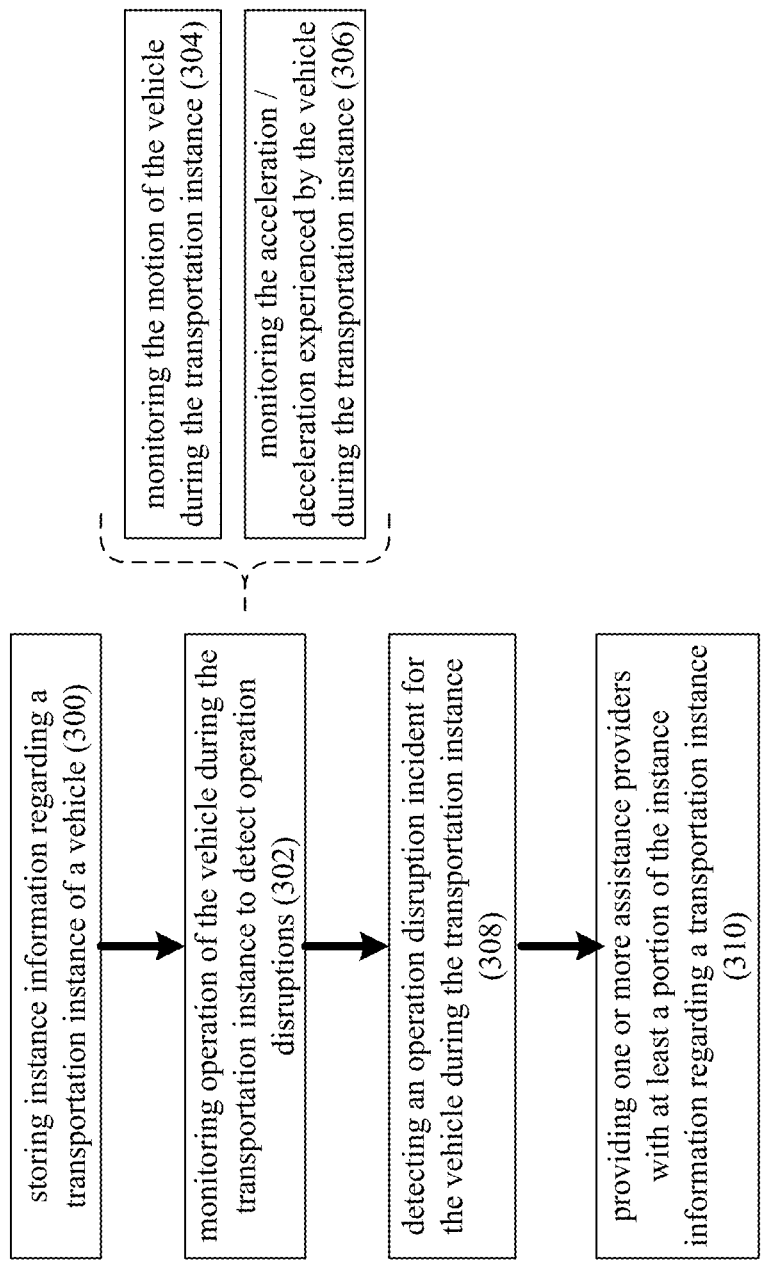
FIG. 3 is a flowchart of an implementation of the roadside assistance process of FIG. 1 according to an implementation of the present disclosure.

Referring also to FIG. 3, roadside assistance process 10 may store 300 instance information (e.g., instance information 206) regarding a transportation instance (e.g., transportation instance 204) of a vehicle (e.g., vehicle 202).

As discussed above, the transportation instance (e.g., transportation instance 204) may be all or a portion of a transportation route for the vehicle (e.g., vehicle 202), wherein the vehicle (e.g., vehicle 202) may be a commercial vehicle (e.g., a tractor-trailer, a delivery van, a box truck, a tanker truck, a flatbed truck, etc.). As discussed above, assume for this example that the vehicle (e.g., vehicle 202) is a loaded tractor-trailer that is hauling a shipment of canned vegetables from Pittsburgh, Pennsylvania to Denver, Colorado. Accordingly, instance information (e.g., instance information 206) may define all or a portion of a shipping route along which the vehicle (e.g., vehicle 202) may travel from Pittsburgh, Pennsylvania to Denver, Colorado, as well as various information about the shipment itself.

The instance information (e.g., instance information 206) regarding the transportation instance (e.g., transportation instance 204) of the vehicle (e.g., vehicle 202) may include one or more of: size information concerning the vehicle (e.g., vehicle 202); type information concerning the vehicle (e.g., vehicle 202); weight information concerning the vehicle (e.g., vehicle 202); duration information for the transportation instance (e.g., transportation instance 204); velocity information for the vehicle (e.g., vehicle 202) during the transportation instance (e.g., transportation instance 204); current location information for the vehicle (e.g., vehicle 202) during the transportation instance (e.g., transportation instance 204); destination location information for the transportation instance (e.g., transportation instance 204); and starting location information for the transportation instance (e.g., transportation instance 204).

Some or all of the instance information (e.g., instance information 206) may be obtained from e.g., the driver (e.g., driver 200) of the vehicle (e.g., vehicle 202), a manifest associated with the vehicle (e.g., vehicle 202) and/or the transportation instance (e.g., transportation instance 204), a shipping company associated with the vehicle (e.g., vehicle 202) and/or the transportation instance (e.g., transportation instance 204), a dispatcher of the vehicle (e.g., vehicle 202), etc.

Size Information Concerning the Vehicle: This information may refer to the dimensions of the commercial vehicle, including its length, width, and height. This data is essential for determining if the vehicle can navigate certain roadways or fit within specific spaces (e.g., tunnels, bridges, or parking facilities) and is crucial for determining the appropriate towing or transport equipment required.

Type Information Concerning the Vehicle: This information may define the classification or category of the commercial vehicle, such as whether it is a semi-truck, flatbed truck, box truck, tanker truck, or another specific type. The type of vehicle often dictates the towing requirements and transportation regulations, as well as any restrictions on certain roads or infrastructure.

Weight Information Concerning the Vehicle: This information may include the gross weight of the vehicle, which may encompass the vehicle's own weight (curb weight) plus the weight of any cargo it is carrying. Weight information is vital for determining the load capacity of roads, bridges, and for selecting the correct towing or transportation equipment. Overweight vehicles may require special permits or routes.

Duration Information for the Transportation Instance: This information may refer to the total time the transportation or towing instance is expected to take, from the starting point to the destination. This includes factors like traffic conditions, road quality, distance, and potential delays. In logistics, duration can affect scheduling, delivery windows, and legal limits for driver operating hours.

Velocity Information for the Vehicle During the Transportation Instance: This information may concern the speed at which the vehicle is traveling during the transportation instance. Monitoring velocity is important for ensuring the vehicle adheres to speed limits and operates safely. It can also impact fuel efficiency, wear and tear, and legal compliance with speed regulations. Such velocity information may be obtained from (calculated via) a global positioning system (GPS) chipset incorporated into a handheld electronic device (e.g., cellphone 208) carried by the driver (e.g., driver 200) within the vehicle (e.g., vehicle 202).

Current Location Information for the Vehicle During the Transportation Instance: This information may be the real-time geographic position of the vehicle as it moves along its route. Current location information is often provided through GPS tracking systems, enabling real-time monitoring of the vehicle's journey. This information may be important for logistics coordination, security, and providing updates to clients or dispatchers. Such location information may be obtained from (calculated via) a global positioning system (GPS) chipset incorporated into a handheld electronic device (e.g., cellphone 208) carried by the driver (e.g., driver 200) within the vehicle (e.g., vehicle 202).

Destination Location Information for the Transportation Instance: This information may define the final point where the vehicle or its cargo is intended to arrive. It could be a warehouse, distribution center, port, or other delivery location. Accurate destination information is necessary for routing, scheduling, and ensuring on-time delivery or drop-off.

Starting Location Information for the Transportation Instance: This information may refer to the initial point where the vehicle or its cargo originated from. It could be a warehouse, distribution center, port, or other starting location. The starting location may be important for planning the route and estimating the total distance and time required for the transportation.

Roadside assistance process 10 may monitor 302 operation of the vehicle (e.g., vehicle 202) during the transportation instance (e.g., transportation instance 204) to detect operation disruptions.

For example and when monitoring 302 operation of the vehicle (e.g., vehicle 202) during the transportation instance (e.g., transportation instance 204) to detect operation disruptions, roadside assistance process 10 may monitor 304 the motion of the vehicle (e.g., vehicle 202) during the transportation instance (e.g., transportation instance 204). Such motion information may be obtained from (calculated via) a global positioning system (GPS) chipset incorporated into a handheld electronic device (e.g., cellphone 208) carried by the driver (e.g., driver 200) within the vehicle (e.g., vehicle 202).

Further and when monitoring 302 operation of the vehicle (e.g., vehicle 202) during the transportation instance (e.g., transportation instance 204) to detect operation disruptions, roadside assistance process 10 may monitor 306 the acceleration/deceleration experienced by the vehicle (e.g., vehicle 202) during the transportation instance (e.g., transportation instance 204). Such acceleration/deceleration information may be obtained from (calculated via) one or more accelerometers incorporated into a handheld electronic device (e.g., cellphone 208) carried by the driver (e.g., driver 200) within the vehicle (e.g., vehicle 202).

Roadside assistance process 10 may detect 308 an operation disruption incident (e.g., operation disruption incident 210) for the vehicle (e.g., vehicle 202) during the transportation instance (e.g., transportation instance 204). Examples of such an operation disruption incident (e.g., operation disruption incident 210) may include but are not limited to a vehicle failure incident and/or a vehicle accident incident.

A Vehicle Failure Incident may include a situation in which the vehicle (e.g., vehicle 202) is experiencing a breakdown, such as a mechanical failure, an electrical failure, a flat tire, etc. Such a vehicle failure incident may be detected via a global positioning system (GPS) chipset incorporated into a handheld electronic device (e.g., cellphone 208) carried by the driver (e.g., driver 200) within the vehicle (e.g., vehicle 202). For example, if the vehicle (e.g., vehicle 202) is not moving (i.e., has no velocity), is not stuck in traffic and is not located in a designated rest area, roadside assistance process 10 may assume that the driver (e.g., driver 200) of the vehicle (e.g., vehicle 202) is experiencing a vehicle failure incident. Additionally/alternatively, roadside assistance process 10 may contact the driver (e.g., driver 200) of the vehicle (e.g., vehicle 202) to determine if they are experiencing such a vehicle failure incident. Additionally/alternatively, the driver (e.g., driver 200) of the vehicle (e.g., vehicle 202) may proactively notify roadside assistance process 10 to report that they are experiencing such a vehicle failure incident.

A Vehicle Accident Incident may include a situation in which the vehicle (e.g., vehicle 202) has been involved in a single vehicle (or multi-vehicle) accident. Such a vehicle accident incident may be detected via a global positioning system (GPS) chipset and/or accelerometer(s) incorporated into a handheld electronic device (e.g., cellphone 208) carried by the driver (e.g., driver 200) within the vehicle (e.g., vehicle 202). For example, if the vehicle (e.g., vehicle 202) experienced a larger level of deceleration (e.g., >10 Gs) and vehicle movement has stopped (i.e., has no velocity), roadside assistance process 10 may assume that the driver (e.g., driver 200) of the vehicle (e.g., vehicle 202) is experiencing a vehicle accident incident. Additionally/alternatively, roadside assistance process 10 may contact the driver (e.g., driver 200) of the vehicle (e.g., vehicle 202) to determine if they are experiencing such a vehicle accident incident. Additionally/alternatively, the driver (e.g., driver 200) of the vehicle (e.g., vehicle 202) may proactively notify roadside assistance process 10 to report that they are experiencing such a vehicle accident incident Roadside assistance process 10 may provide 310 one or more assistance providers (e.g., assistance providers 212) with at least a portion of the instance information (e.g., instance information 206) regarding a transportation instance (e.g., transportation instance 204). These one or more assistance providers (e.g., assistance providers 212) may include one or more roadside assistance providers and/or one or more emergency personnel (e.g., police. fire and/or ambulance).

As discussed above, the instance information (e.g., instance information 206) regarding the transportation instance (e.g., transportation instance 204) of the vehicle (e.g., vehicle 202) may include one or more of: size information concerning the vehicle (e.g., vehicle 202); type information concerning the vehicle (e.g., vehicle 202); weight information concerning the vehicle (e.g., vehicle 202); duration information for the transportation instance (e.g., transportation instance 204); velocity information for the vehicle (e.g., vehicle 202) during the transportation instance (e.g., transportation instance 204); current location information for the vehicle (e.g., vehicle 202) during the transportation instance (e.g., transportation instance 204); destination location information for the transportation instance (e.g., transportation instance 204); and starting location information for the transportation instance (e.g., transportation instance 204).

Accordingly and in the event that roadside assistance process 10 detects 308 an operation disruption incident (e.g., operation disruption incident 210) for the vehicle (e.g., vehicle 202) during the transportation instance (e.g., transportation instance 204), roadside assistance process 10 may provide 310 one or more assistance providers (e.g., assistance providers 212) with at least a portion of the instance information (e.g., instance information 206) regarding a transportation instance (e.g., transportation instance 204), such as e.g., size information concerning the vehicle (e.g., vehicle 202); type information concerning the vehicle (e.g., vehicle 202); weight information concerning the vehicle (e.g., vehicle 202); and current location information for the vehicle (e.g., vehicle 202). By providing 310 one or more assistance providers (e.g., assistance providers 212) with at least a portion of the instance information (e.g., instance information 206) regarding a transportation instance (e.g., transportation instance 202), the location of the vehicle (e.g., vehicle 200) as well as information concerning the vehicle (e.g., vehicle 200) itself may be defined so that the appropriate servicing/towing/first responders may be dispatched. Accordingly, a 90,000 pound tractor-trailer may require heavy duty towing equipment that is not required for a 10,000 pound flatbed truck.

Concept 2—Prescreening Providers, Receiving Bids, and Selecting a Provider

Figure 4:
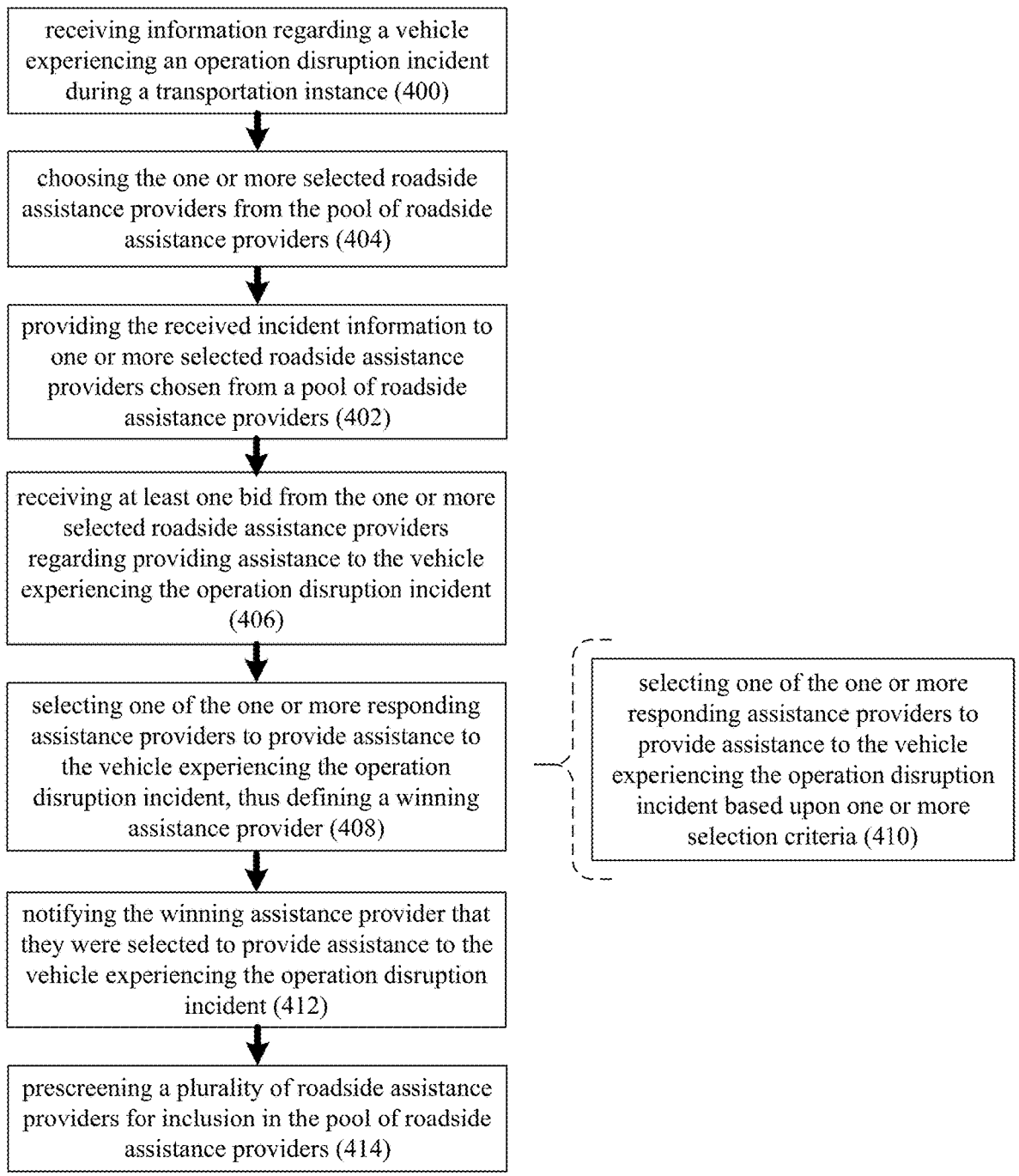
FIG. 4 is a flowchart of another implementation of the roadside assistance process of FIG. 1 according to an implementation of the present disclosure.

Referring also to FIG. 4, roadside assistance process 10 may receive 400 information regarding a vehicle (e.g., vehicle 202) experiencing an operation disruption incident (e.g., operation disruption incident 210) during a transportation instance (e.g., transportation instance 204), thus defining received incident information (e.g., received incident information 214).

As discussed above, the transportation instance (e.g., transportation instance 204) may be all or a portion of a transportation route for the vehicle (e.g., vehicle 202), wherein the vehicle (e.g., vehicle 202) may be a commercial vehicle (e.g., a tractor-trailer, a delivery van, a box truck, a tanker truck, a flatbed truck, etc.). As also discussed above, examples of such an operation disruption incident (e.g., operation disruption incident 210) may include but are not limited to a vehicle failure incident and/or a vehicle accident incident. As also discussed above, the transportation instance (e.g., transportation instance 204) may be all or a portion of a transportation route for the vehicle (e.g., vehicle 202).

The received incident information (e.g., received incident information 214) may include one or more of: size information concerning the vehicle; type information concerning the vehicle; weight information concerning the vehicle; duration information for the transportation instance (e.g., transportation instance 204); velocity information for the vehicle during the transportation instance (e.g., transportation instance 204); current location information for the vehicle during the transportation instance (e.g., transportation instance 204); destination location information for the transportation instance (e.g., transportation instance 204); and starting location information for the transportation instance (e.g., transportation instance 204); each of which was described above.

Roadside assistance process 10 may provide 402 the received incident information (e.g., received incident information 214) to one or more selected roadside assistance providers (e.g., selected roadside assistance providers 216) chosen from a pool of roadside assistance providers (e.g., pool of roadside assistance providers 218).

Generally speaking, roadside assistance process 10 may choose 404 the one or more selected roadside assistance providers (e.g., selected roadside assistance providers 216) from the pool of roadside assistance providers (e.g., pool of roadside assistance providers 218) based, at least in part, upon one or more of: a geographic location of the roadside assistance providers defined within the pool of roadside assistance providers (e.g., pool of roadside assistance providers 218), an assistance capability of the roadside assistance providers defined within the pool of roadside assistance providers (e.g., pool of roadside assistance providers 218), and a rating of the roadside assistance providers defined within the pool of roadside assistance providers (e.g., pool of roadside assistance providers 218).

The geographic location of the roadside assistance providers defined within the pool of roadside assistance providers (e.g., pool of roadside assistance providers 218) may be considered by roadside assistance process 10 to ensure that the one or more selected roadside assistance providers (e.g., selected roadside assistance providers 216) is geographically proximate the location of the operation disruption incident (e.g., operation disruption incident 210). As discussed above, the location of the operation disruption incident (e.g., operation disruption incident 210) is defined within the instance information (e.g., instance information 206) regarding the transportation instance (e.g., transportation instance 204) of the vehicle (e.g., vehicle 202).

The assistance capability of the roadside assistance providers defined within the pool of roadside assistance providers (e.g., pool of roadside assistance providers 218) may be considered by roadside assistance process 10 to ensure that the one or more selected roadside assistance providers (e.g., selected roadside assistance providers 216) is capable of addressing the operation disruption incident (e.g., operation disruption incident 210). As discussed above, the size/type/weight of the vehicle (e.g., vehicle 202) involved in the operation disruption incident (e.g., operation disruption incident 210) is defined within the instance information (e.g., instance information 206) regarding the transportation instance (e.g., transportation instance 204) of the vehicle (e.g., vehicle 202).

The rating of the roadside assistance providers defined within the pool of roadside assistance providers (e.g., pool of roadside assistance providers 218) may be considered by roadside assistance process 10 to ensure that the one or more selected roadside assistance providers (e.g., selected roadside assistance providers 216) has a sufficiently high rating to ensure that they provide a high level of customer service.

Once roadside assistance process 10 provides 402 the received incident information (e.g., received incident information 214) to one or more selected roadside assistance providers (e.g., selected roadside assistance providers 216) chosen from a pool of roadside assistance providers (e.g., pool of roadside assistance providers 218), the one or more selected roadside assistance providers (e.g., selected roadside assistance providers 216) may review the received incident information 214 and prepare/submit a bid for addressing the operation disruption incident (e.g., operation disruption incident 210).

Roadside assistance process 10 may receive 406 at least one bid (e.g., bids 220) from the one or more selected roadside assistance providers (e.g., selected roadside assistance providers 216) regarding providing assistance to the vehicle (e.g., vehicle 202) experiencing the operation disruption incident (e.g., operation disruption incident 210), thus defining one or more responding assistance providers (e.g., responding assistance providers 222, 224). For this example, assume that upon the occurrence of operation disruption incident (e.g., operation disruption incident 210), roadside assistance process 10 chooses 404 three roadside assistance providers (e.g., selected roadside assistance providers 216) from the pool of roadside assistance providers (e.g., pool of roadside assistance providers 218), wherein roadside assistance process 10 provides 402 the received incident information (e.g., received incident information 214) to these three roadside assistance providers (e.g., selected roadside assistance providers 216). Further, assume that two of these three roadside assistance providers within selected roadside assistance providers 216 submits a bid (e.g., bids 220), resulting in two responding assistance providers (e.g., responding assistance providers 222, 224).

Roadside assistance process 10 may select 408 one of the one or more responding assistance providers (e.g., responding assistance providers 222, 224) to provide assistance to the vehicle (e.g., vehicle 202) experiencing the operation disruption incident (e.g., operation disruption incident 210), thus defining a winning assistance provider (e.g., winning assistance provider 222).

When selecting 408 one of the one or more responding assistance providers (e.g., responding assistance providers 222, 224) to provide assistance to the vehicle (e.g., vehicle 202) experiencing the operation disruption incident (e.g., operation disruption incident 210), roadside assistance process 10 may select 410 one of the one or more responding assistance providers (e.g., responding assistance providers 222, 224) to provide assistance to the vehicle (e.g., vehicle 202) experiencing the operation disruption incident (e.g., operation disruption incident 210) based upon one or more selection criteria.

The one or more selection criteria may include one or more of: a bid amount of the winning assistance provider (e.g., winning assistance provider 222); a geographic location of the winning assistance provider (e.g., winning assistance provider 222); a rating of the winning assistance provider (e.g., winning assistance provider 222); and a response time of the winning assistance provider (e.g., winning assistance provider 222). For this example, assume that winning assistance provider 222 provided a bid (within bids 220) that was $10,000 less expensive than the competition (e.g., assistance provider 224), Further assume that winning assistance provider 222 has a higher rating (4.6 stars versus 4.2 stars) and is geographically closer (10.6 miles versus 15.2 miles) to the operation disruption incident (e.g., operation disruption incident 210) than the competition (e.g., assistance provider 224), thus enabling a quicker response time.

Roadside assistance process 10 may notify 412 the winning assistance provider (e.g., winning assistance provider 222) that they were selected to provide assistance to the vehicle (e.g., vehicle 202) experiencing the operation disruption incident (e.g., operation disruption incident 210).

Accordingly, winning assistance provider 222 may dispatch the appropriate vehicle(s) to the site of the operation disruption incident (e.g., operation disruption incident 210) to render assistance to the vehicle (e.g., vehicle 202) experiencing the operation disruption incident (e.g., operation disruption incident 210). Such assistance may include but is not limited to towing services, recovery services, site clearing services, accident mitigation services, mobile repair services, tire repair services, load transfer services, etc.

Roadside assistance process 10 may prescreen 414 a plurality of roadside assistance providers for inclusion in the pool of roadside assistance providers (e.g., pool of roadside assistance providers 218). By performing such a prescreening process, roadside assistance process 10 may ensure that all roadside assistance providers in the pool of roadside assistance providers (e.g., pool of roadside assistance providers 218) are qualified to perform such roadside assistance services. Examples of such qualifications may include but are not limited to: Better Business Bureau accreditations, online ratings, years in business, number of recovery vehicles, business capabilities, etc.

Concept 3—Selecting a Provider Based on Geographical Information

Figure 5:
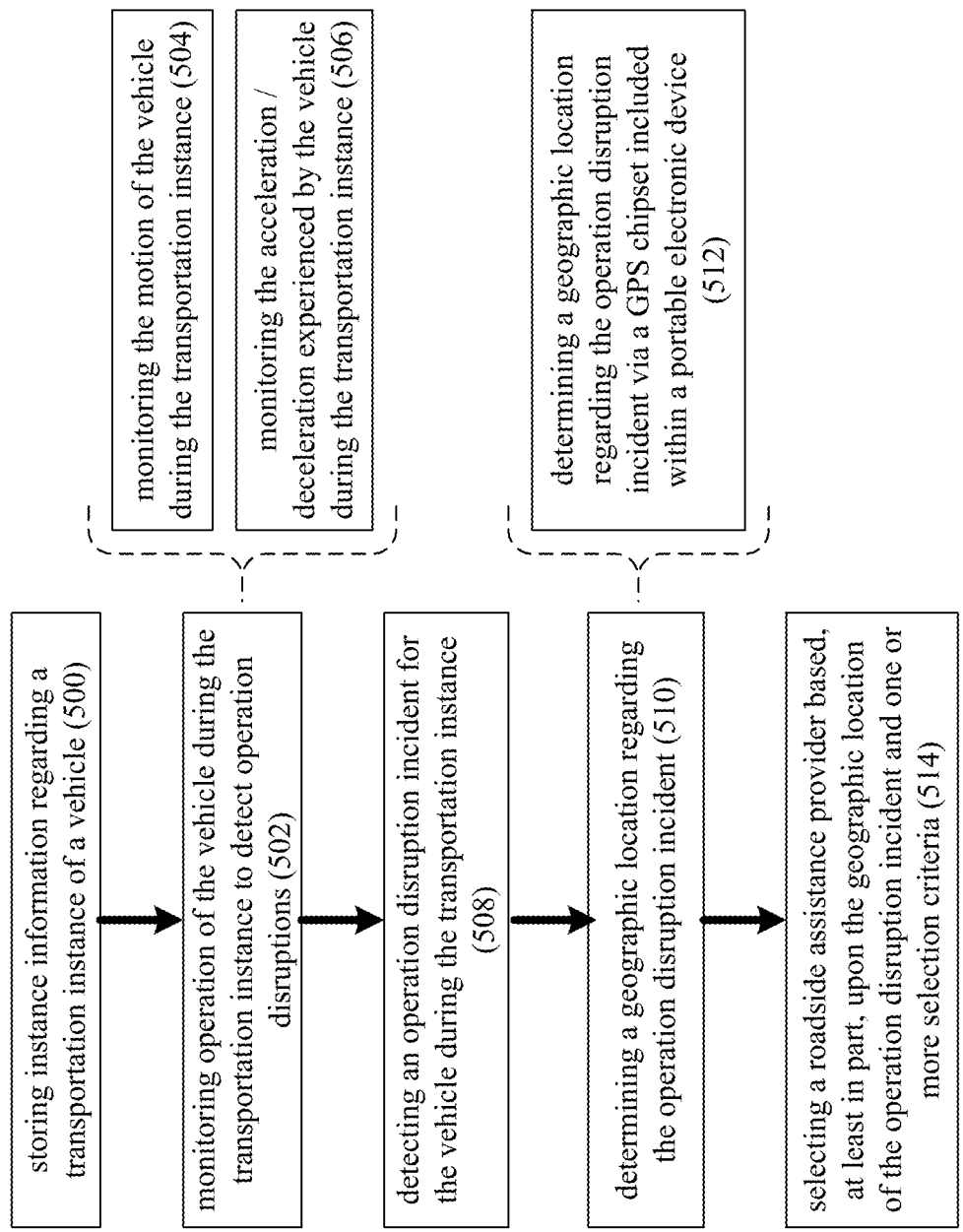
FIG. 5 is a flowchart of another implementation of the roadside assistance process of FIG. 1 according to an implementation of the present disclosure.

Referring also to FIG. 5, roadside assistance process 10 may store 500 instance information (e.g., instance information 206) regarding a transportation instance (e.g., transportation instance 204) of a vehicle (e.g., vehicle 202).

As discussed above, the transportation instance (e.g., transportation instance 204) may be all or a portion of a transportation route for the vehicle (e.g., vehicle 202), wherein the vehicle (e.g., vehicle 202) may be a commercial vehicle (e.g., a tractor-trailer, a delivery van, a box truck, a tanker truck, a flatbed truck, etc.). As discussed above, assume for this example that the vehicle (e.g., vehicle 202) is a loaded tractor-trailer that is hauling a shipment of canned vegetables from Pittsburgh, Pennsylvania to Denver, Colorado. Accordingly, instance information (e.g., instance information 206) may define all or a portion of a shipping route along which the vehicle (e.g., vehicle 202) may travel from Pittsburgh, Pennsylvania to Denver, Colorado, as well as various information about the shipment itself.

As also discussed above, the instance information (e.g., instance information 206) regarding the transportation instance (e.g., transportation instance 204) of the vehicle (e.g., vehicle 202) may include one or more of: size information concerning the vehicle (e.g., vehicle 202); type information concerning the vehicle (e.g., vehicle 202); weight information concerning the vehicle (e.g., vehicle 202); duration information for the transportation instance (e.g., transportation instance 204); velocity information for the vehicle (e.g., vehicle 202) during the transportation instance (e.g., transportation instance 204); current location information for the vehicle (e.g., vehicle 202) during the transportation instance (e.g., transportation instance 204); destination location information for the transportation instance (e.g., transportation instance 204); and starting location information for the transportation instance (e.g., transportation instance 204).

Some or all of the instance information (e.g., instance information 206) may be obtained from e.g., the driver (e.g., driver 200) of the vehicle (e.g., vehicle 202), a manifest associated with the vehicle (e.g., vehicle 202) and/or the transportation instance (e.g., transportation instance 204), a shipping company associated with the vehicle (e.g., vehicle 202) and/or the transportation instance (e.g., transportation instance 204), a dispatcher of the vehicle (e.g., vehicle 202), etc.

Roadside assistance process 10 may monitor 502 operation of the vehicle (e.g., vehicle 202) during the transportation instance (e.g., transportation instance 204) to detect operation disruptions.

For example and when monitoring 502 operation of the vehicle (e.g., vehicle 202) during the transportation instance (e.g., transportation instance 204) to detect operation disruptions, roadside assistance process 10 may monitor 504 the motion of the vehicle (e.g., vehicle 202) during the transportation instance (e.g., transportation instance 204). As discussed above, such motion information may be obtained from (calculated via) a global positioning system (GPS) chipset incorporated into a handheld electronic device (e.g., cellphone 208) carried by the driver (e.g., driver 200) within the vehicle (e.g., vehicle 202).

Further and when monitoring 502 operation of the vehicle (e.g., vehicle 202) during the transportation instance (e.g., transportation instance 204) to detect operation disruptions, roadside assistance process 10 may monitor 506 the acceleration/deceleration experienced by the vehicle (e.g., vehicle 202) during the transportation instance (e.g., transportation instance 204). As discussed above, such acceleration/deceleration information may be obtained from (calculated via) one or more accelerometers incorporated into a handheld electronic device (e.g., cellphone 208) carried by the driver (e.g., driver 200) within the vehicle (e.g., vehicle 202).

Roadside assistance process 10 may detect 508 an operation disruption incident (e.g., operation disruption incident 210) for the vehicle (e.g., vehicle 202) during the transportation instance (e.g., transportation instance 204). As discussed above, examples of such an operation disruption incident (e.g., operation disruption incident 210) may include but are not limited to a vehicle failure incident and/or a vehicle accident incident.

Roadside assistance process 10 may determine 510 a geographic location (e.g., geographic location 226) regarding the operation disruption incident (e.g., operation disruption incident 210). For this example, assume that the driver (e.g., driver 200) of the vehicle (e.g., vehicle 202) slid on ice while driving through rural Missouri, resulting in a single vehicle accident in which vehicle 202 sideswiped a roadside guardrail that disabled vehicle 202. Sensing the impact and detecting a lack of motion of vehicle 202, roadside assistance process 10 may initiate contact with the driver (e.g., driver 200) of the vehicle (e.g., vehicle 202). Roadside assistance process 10 may inquire as to whether the driver (e.g., driver 200) of the vehicle (e.g., vehicle 202) was involved in an accident (which driver 200 confirmed) and may inquire as to whether medical assistance is needed (which driver 200 declined).

Accordingly, roadside assistance process 10 may determine 510 the geographic location (e.g., geographic location 226) regarding the operation disruption incident (e.g., operation disruption incident 210). When determining 510 a geographic location (e.g., geographic location 226) regarding the operation disruption incident (e.g., operation disruption incident 210), roadside assistance process 10 may determine 512 a geographic location (e.g., geographic location 226) regarding the operation disruption incident (e.g., operation disruption incident 210) via a GPS chipset included within a portable electronic device (e.g., cellphone 208).

Roadside assistance process 10 may select 514 a roadside assistance provider (e.g., roadside assistance provider 222)

based, at least in part, upon the geographic location (e.g., geographic location 226) of the operation disruption incident (e.g., operation disruption incident 210) and one or more selection criteria, wherein the one or more selection criteria may include: at least a portion of the instance information (e.g., instance information 206) regarding the transportation instance (e.g., transportation instance 204) of the vehicle (e.g., vehicle 202).

The one or more selection criteria may also include one or more of: a geographic location of the roadside assistance provider (e.g., roadside assistance provider 222); a rating of the roadside assistance provider (e.g., roadside assistance provider 222); and a response time of the roadside assistance provider (e.g., roadside assistance provider 222). For this example, assume that roadside assistance provider 222 is only 10.6 miles from the geographic location (e.g., geographic location 226) of the operation disruption incident (e.g., operation disruption incident 210), thus enabling a comparatively quick response time. Further assume that roadside assistance provider 222 has a comparatively high rating of 4.6 stars.

As discussed above, roadside assistance process 10 may notify the roadside assistance provider (e.g., roadside assistance provider 222) that they were selected to provide assistance to the vehicle (e.g., vehicle 202) experiencing the operation disruption incident (e.g., operation disruption incident 210). Accordingly, roadside assistance provider 222 may dispatch the appropriate vehicle(s) to the site of the operation disruption incident (e.g., operation disruption incident 210) to render assistance to the vehicle (e.g., vehicle 202) experiencing the operation disruption incident (e.g., operation disruption incident 210). Such assistance may include but is not limited to towing services, recovery services, site clearing services, accident mitigation services, mobile repair services, tire repair services, load transfer services, etc.

Concept 4—Submitting Information to Liability Processor

Figure 6:
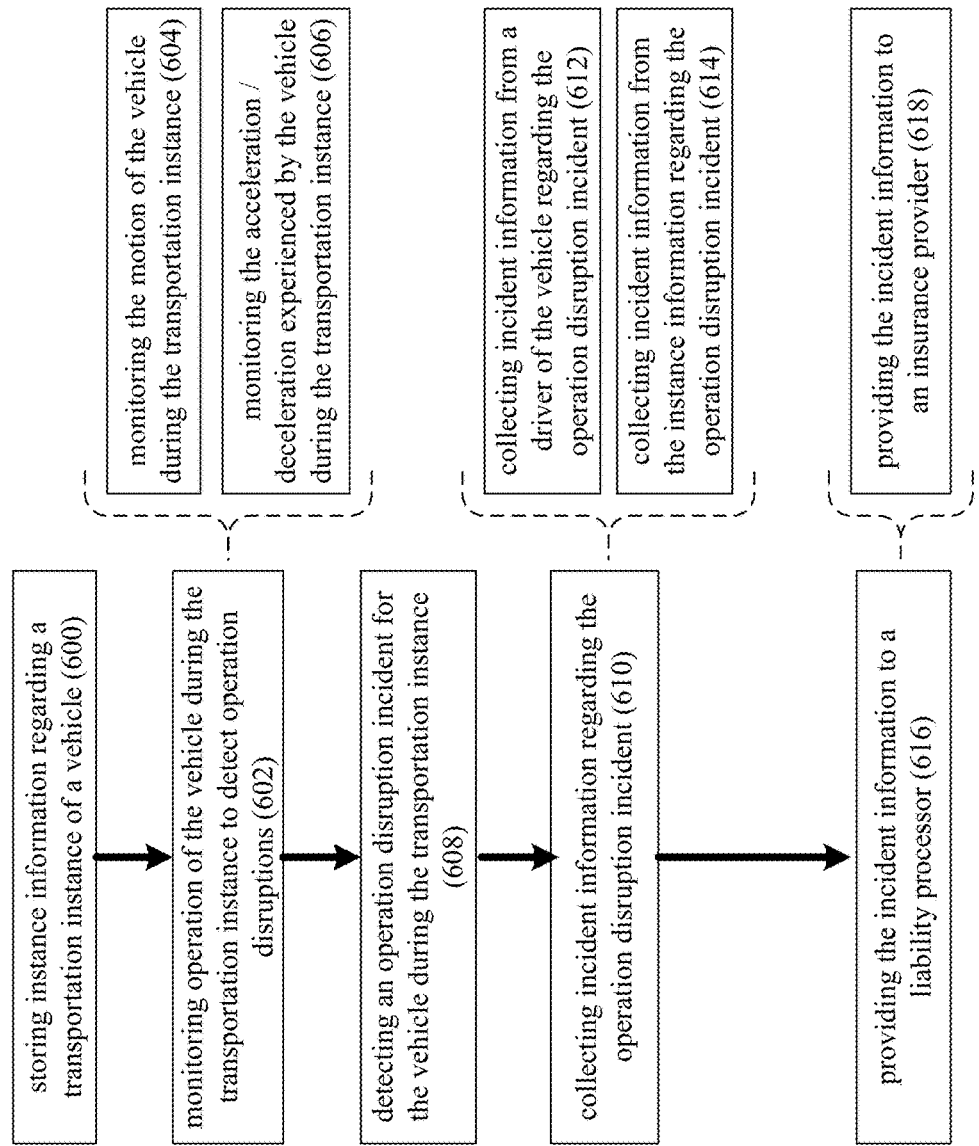
FIG. 6 is a flowchart of another implementation of the roadside assistance process of FIG. 1 according to an implementation of the present disclosure.

Referring also to FIG. 6, roadside assistance process 10 may store 600 instance information (e.g., instance information 206) regarding a transportation instance (e.g., transportation instance 204) of a vehicle (e.g., vehicle 202).

As discussed above, the transportation instance (e.g., transportation instance 204) may be all or a portion of a transportation route for the vehicle (e.g., vehicle 202), wherein the vehicle (e.g., vehicle 202) may be a commercial vehicle (e.g., a tractor-trailer, a delivery van, a box truck, a tanker truck, a flatbed truck, etc.). As discussed above, assume for this example that the vehicle (e.g., vehicle 202) is a loaded tractor-trailer that is hauling a shipment of canned vegetables from Pittsburgh, Pennsylvania to Denver, Colorado. Accordingly, instance information (e.g., instance information 206) may define all or a portion of a shipping route along which the vehicle (e.g., vehicle 202) may travel from Pittsburgh, Pennsylvania to Denver, Colorado, as well as various information about the shipment itself.

As also discussed above, the instance information (e.g., instance information 206) regarding the transportation instance (e.g., transportation instance 204) of the vehicle (e.g., vehicle 202) may include one or more of: size information concerning the vehicle (e.g., vehicle 202); type information concerning the vehicle (e.g., vehicle 202); weight information concerning the vehicle (e.g., vehicle 202); duration information for the transportation instance (e.g., transportation instance 204); velocity information for the vehicle (e.g., vehicle 202) during the transportation instance (e.g., transportation instance 204); current location information for the vehicle (e.g., vehicle 202) during the transportation instance (e.g., transportation instance 204); destination location information for the transportation instance (e.g., transportation instance 204); and starting location information for the transportation instance (e.g., transportation instance 204).

Some or all of the instance information (e.g., instance information 206) may be obtained from e.g., the driver (e.g., driver 200) of the vehicle (e.g., vehicle 202), a manifest associated with the vehicle (e.g., vehicle 202) and/or the transportation instance (e.g., transportation instance 204), a shipping company associated with the vehicle (e.g., vehicle 202) and/or the transportation instance (e.g., transportation instance 204), a dispatcher of the vehicle (e.g., vehicle 202), etc.

Roadside assistance process 10 may monitor 602 operation of the vehicle (e.g., vehicle 202) during the transportation instance (e.g., transportation instance 204) to detect operation disruptions.

For example and when monitoring 602 operation of the vehicle (e.g., vehicle 202) during the transportation instance (e.g., transportation instance 204) to detect operation disruptions, roadside assistance process 10 may monitor 604 the motion of the vehicle (e.g., vehicle 202) during the transportation instance (e.g., transportation instance 204). As discussed above, such motion information may be obtained from (calculated via) a global positioning system (GPS) chipset incorporated into a handheld electronic device (e.g., cellphone 208) carried by the driver (e.g., driver 200) within the vehicle (e.g., vehicle 202).

Further and when monitoring 602 operation of the vehicle (e.g., vehicle 202) during the transportation instance (e.g., transportation instance 204) to detect operation disruptions, roadside assistance process 10 may monitor 606 the acceleration/deceleration experienced by the vehicle (e.g., vehicle 202) during the transportation instance (e.g., transportation instance 204). As discussed above, such acceleration/deceleration information may be obtained from (calculated via) one or more accelerometers incorporated into a handheld electronic device (e.g., cellphone 208) carried by the driver (e.g., driver 200) within the vehicle (e.g., vehicle 202).

Roadside assistance process 10 may detect 608 an operation disruption incident (e.g., operation disruption incident 210) for the vehicle (e.g., vehicle 202) during the transportation instance (e.g., transportation instance 204). As discussed above, examples of such an operation disruption incident (e.g., operation disruption incident 210) may include but are not limited to a vehicle failure incident and/or a vehicle accident incident.

Roadside assistance process 10 may collect 610 incident information (e.g., incident information 228) regarding the operation disruption incident (e.g., operation disruption incident 210). For example and when collecting 610 incident information (e.g., incident information 228) regarding the operation disruption incident (e.g., operation disruption incident 210), roadside assistance process 10 may collect 612 incident information (e.g., incident information 228) from a driver (e.g., driver 200) of the vehicle (e.g., vehicle 202) regarding the operation disruption incident (e.g., operation disruption incident 210). For example, roadside assistance process 10 may collect 612 incident information (e.g., incident information 228) from the driver (e.g., driver 200) of the vehicle (e.g., vehicle 202) concerning e.g., damage to vehicle 200, damage to other vehicles (if applicable), damage to public/private property (if applicable), events leading up to the operation disruption incident (e.g., operation disruption incident 210), weather conditions leading up to the operation disruption incident (e.g., operation disruption incident 210), driving conditions leading up to the operation disruption incident (e.g., operation disruption incident 210), current road conditions (e.g., closed/passable), spillage (e.g., cargo, fuel, oil, toxic chemicals), current state of scene (e.g., fire, smoking, smoldering), etc.

Further and when collecting 610 incident information (e.g., incident information 228) regarding the operation disruption incident (e.g., operation disruption incident 210), roadside assistance process 10 may collect 614 incident information (e.g., incident information 228) from the instance information (e.g., instance information 206) regarding the operation disruption incident (e.g., operation disruption incident 210). As discussed above, the instance information (e.g., instance information 206) regarding the transportation instance (e.g., transportation instance 204) of the vehicle (e.g., vehicle 202) may include one or more of: size information concerning the vehicle (e.g., vehicle 202); type information concerning the vehicle (e.g., vehicle 202); weight information concerning the vehicle (e.g., vehicle 202); duration information for the transportation instance (e.g., transportation instance 204); velocity information for the vehicle (e.g., vehicle 202) during the transportation instance (e.g., transportation instance 204); current location information for the vehicle (e.g., vehicle 202) during the transportation instance (e.g., transportation instance 204); destination location information for the transportation instance (e.g., transportation instance 204); and starting location information for the transportation instance (e.g., transportation instance 204). Accordingly, roadside assistance process 10 may collect 614 some or all of incident information (e.g., incident information 228) from the instance information (e.g., instance information 206) regarding the operation disruption incident (e.g., operation disruption incident 210).

Once collected, roadside assistance process 10 may provide 616 the incident information (e.g., incident information 228) to a liability processor (e.g., liability processor 230). For example and when providing 616 the incident information to a liability processor, roadside assistance process 10 may provide 618 the incident information to an insurance provider, such as an insurance company that provides liability insurance services for the vehicle (e.g., vehicle 202) involved in the operation disruption incident (e.g., operation disruption incident 210). By proactively providing 616 the incident information (e.g., incident information 228) to the liability processor (e.g., liability processor 230), the processing of any related insurance claim may be jumpstarted.

Concept 5—Notifying Emergency Personnel

Figure 7:
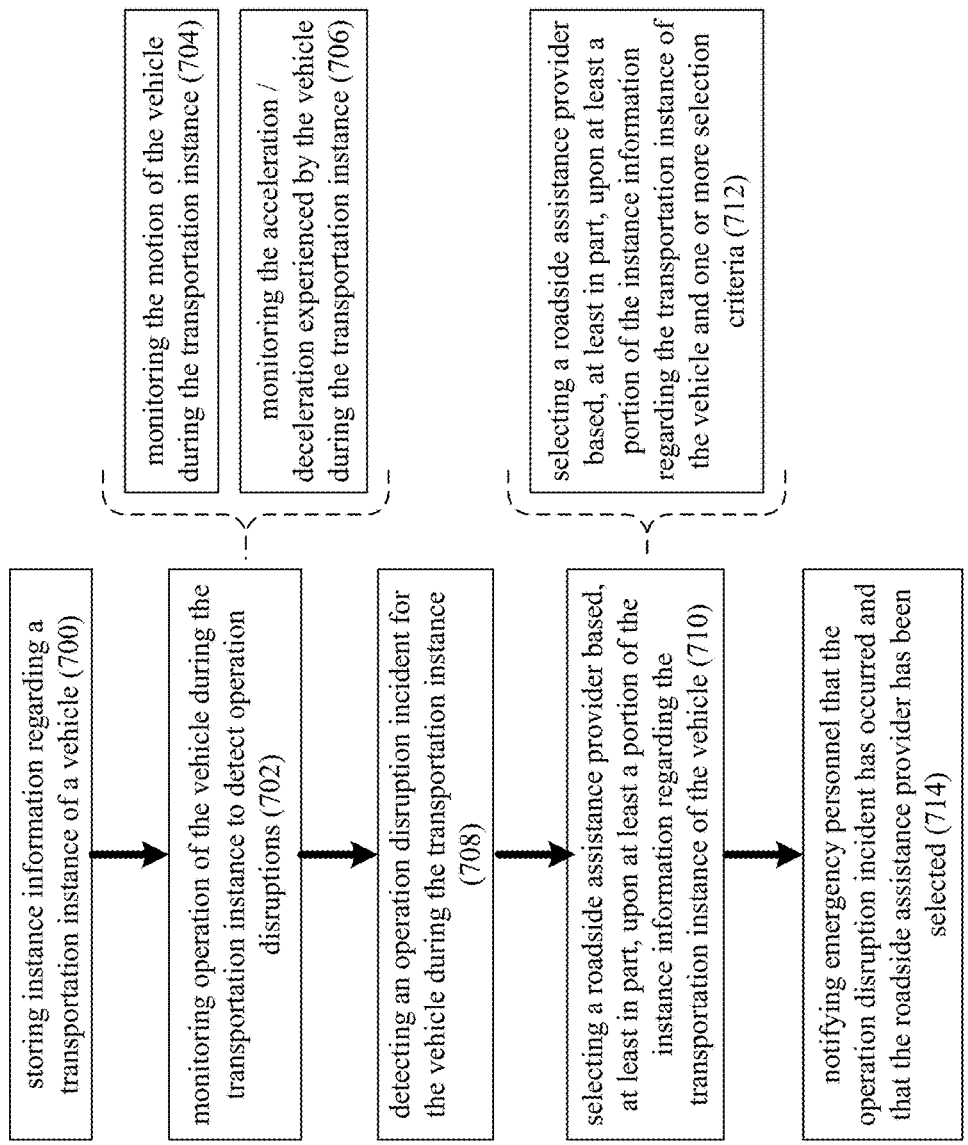
FIG. 7 is a flowchart of another implementation of the roadside assistance process of FIG. 1 according to an implementation of the present disclosure.

Referring also to FIG. 7, roadside assistance process 10 may store 700 instance information (e.g., instance information 206) regarding a transportation instance (e.g., transportation instance 204) of a vehicle (e.g., vehicle 202).

As discussed above, the transportation instance (e.g., transportation instance 204) may be all or a portion of a transportation route for the vehicle (e.g., vehicle 202), wherein the vehicle (e.g., vehicle 202) may be a commercial vehicle (e.g., a tractor-trailer, a delivery van, a box truck, a tanker truck, a flatbed truck, etc.). As discussed above, assume for this example that the vehicle (e.g., vehicle 202) is a loaded tractor-trailer that is hauling a shipment of canned vegetables from Pittsburgh, Pennsylvania to Denver, Colorado. Accordingly, instance information (e.g., instance information 206) may define all or a portion of a shipping route along which the vehicle (e.g., vehicle 202) may travel from Pittsburgh, Pennsylvania to Denver, Colorado, as well as various information about the shipment itself.

As also discussed above, the instance information (e.g., instance information 206) regarding the transportation instance (e.g., transportation instance 204) of the vehicle (e.g., vehicle 202) may include one or more of: size information concerning the vehicle (e.g., vehicle 202); type information concerning the vehicle (e.g., vehicle 202); weight information concerning the vehicle (e.g., vehicle 202); duration information for the transportation instance (e.g., transportation instance 204); velocity information for the vehicle (e.g., vehicle 202) during the transportation instance (e.g., transportation instance 204); current location information for the vehicle (e.g., vehicle 202) during the transportation instance (e.g., transportation instance 204); destination location information for the transportation instance (e.g., transportation instance 204); and starting location information for the transportation instance (e.g., transportation instance 204).

Some or all of the instance information (e.g., instance information 206) may be obtained from e.g., the driver (e.g., driver 200) of the vehicle (e.g., vehicle 202), a manifest associated with the vehicle (e.g., vehicle 202) and/or the transportation instance (e.g., transportation instance 204), a shipping company associated with the vehicle (e.g., vehicle 202) and/or the transportation instance (e.g., transportation instance 204), a dispatcher of the vehicle (e.g., vehicle 202), etc.

Roadside assistance process 10 may monitor 702 operation of the vehicle (e.g., vehicle 202) during the transportation instance (e.g., transportation instance 204) to detect operation disruptions.

For example and when monitoring 702 operation of the vehicle (e.g., vehicle 202) during the transportation instance (e.g., transportation instance 204) to detect operation disruptions, roadside assistance process 10 may monitor 704 the motion of the vehicle (e.g., vehicle 202) during the transportation instance (e.g., transportation instance 204). As discussed above, such motion information may be obtained from (calculated via) a global positioning system (GPS) chipset incorporated into a handheld electronic device (e.g., cellphone 208) carried by the driver (e.g., driver 200) within the vehicle (e.g., vehicle 202).

Further and when monitoring 702 operation of the vehicle (e.g., vehicle 202) during the transportation instance (e.g., transportation instance 204) to detect operation disruptions, roadside assistance process 10 may monitor 706 the acceleration/deceleration experienced by the vehicle (e.g., vehicle 202) during the transportation instance (e.g., transportation instance 204). As discussed above, such acceleration/deceleration information may be obtained from (calculated via) one or more accelerometers incorporated into a handheld electronic device (e.g., cellphone 208) carried by the driver (e.g., driver 200) within the vehicle (e.g., vehicle 202).

Roadside assistance process 10 may detect 708 an operation disruption incident (e.g., operation disruption incident 210) for the vehicle (e.g., vehicle 202) during the transportation instance (e.g., transportation instance 204). As discussed above, examples of such an operation disruption incident (e.g., operation disruption incident 210) may include but are not limited to a vehicle failure incident and/or a vehicle accident incident.

Roadside assistance process 10 may select 710 a roadside assistance provider (e.g., roadside assistance providers 222) based, at least in part, upon at least a portion of the instance information (e.g., instance information 206) regarding the transportation instance (e.g., transportation instance 204) of the vehicle (e.g., vehicle 202).

When selecting 710 a roadside assistance provider (e.g., roadside assistance providers 222) based, at least in part, upon at least a portion of the instance information (e.g., instance information 206) regarding the transportation instance (e.g., transportation instance 204) of the vehicle (e.g., vehicle 202), roadside assistance process 10 may select 712 a roadside assistance provider (e.g., roadside assistance providers 222) based, at least in part, upon at least a portion of the instance information (e.g., instance information 206) regarding the transportation instance (e.g., transportation instance 204) of the vehicle (e.g., vehicle 202) and one or more selection criteria.

As discussed above, the one or more selection criteria may include one or more of: a geographic location of the roadside assistance provider (e.g., roadside assistance provider 222); a rating of the roadside assistance provider (e.g., roadside assistance provider 222); and a response time of the roadside assistance provider (e.g., roadside assistance provider 222). For this example, assume that roadside assistance provider 222 is only 10.6 miles from the geographic location (e.g., geographic location 226) of the operation disruption incident (e.g., operation disruption incident 210), thus enabling a comparatively quick response time. Further assume that roadside assistance provider 222 has a comparatively high rating of 4.6 stars.

As discussed above, roadside assistance process 10 may notify the roadside assistance provider (e.g., roadside assistance provider 222) that they were selected to provide assistance to the vehicle (e.g., vehicle 202) experiencing the operation disruption incident (e.g., operation disruption incident 210). Accordingly, roadside assistance provider 222 may dispatch the appropriate vehicle(s) to the site of the operation disruption incident (e.g., operation disruption incident 210) to render assistance to the vehicle (e.g., vehicle 202) experiencing the operation disruption incident (e.g., operation disruption incident 210). Such assistance may include but is not limited to towing services, recovery services, site clearing services, accident mitigation services, mobile repair services, tire repair services, load transfer services, etc.

Additionally, roadside assistance process 10 may notify 714 emergency personnel (e.g., police. fire and/or ambulance) that the operation disruption incident (e.g., operation disruption incident 210) has occurred and that the roadside assistance provider (e.g., roadside assistance provider 222) has been selected and/or notified.

Concept 6—Generating and Updating Ranking of Providers

Figure 8:
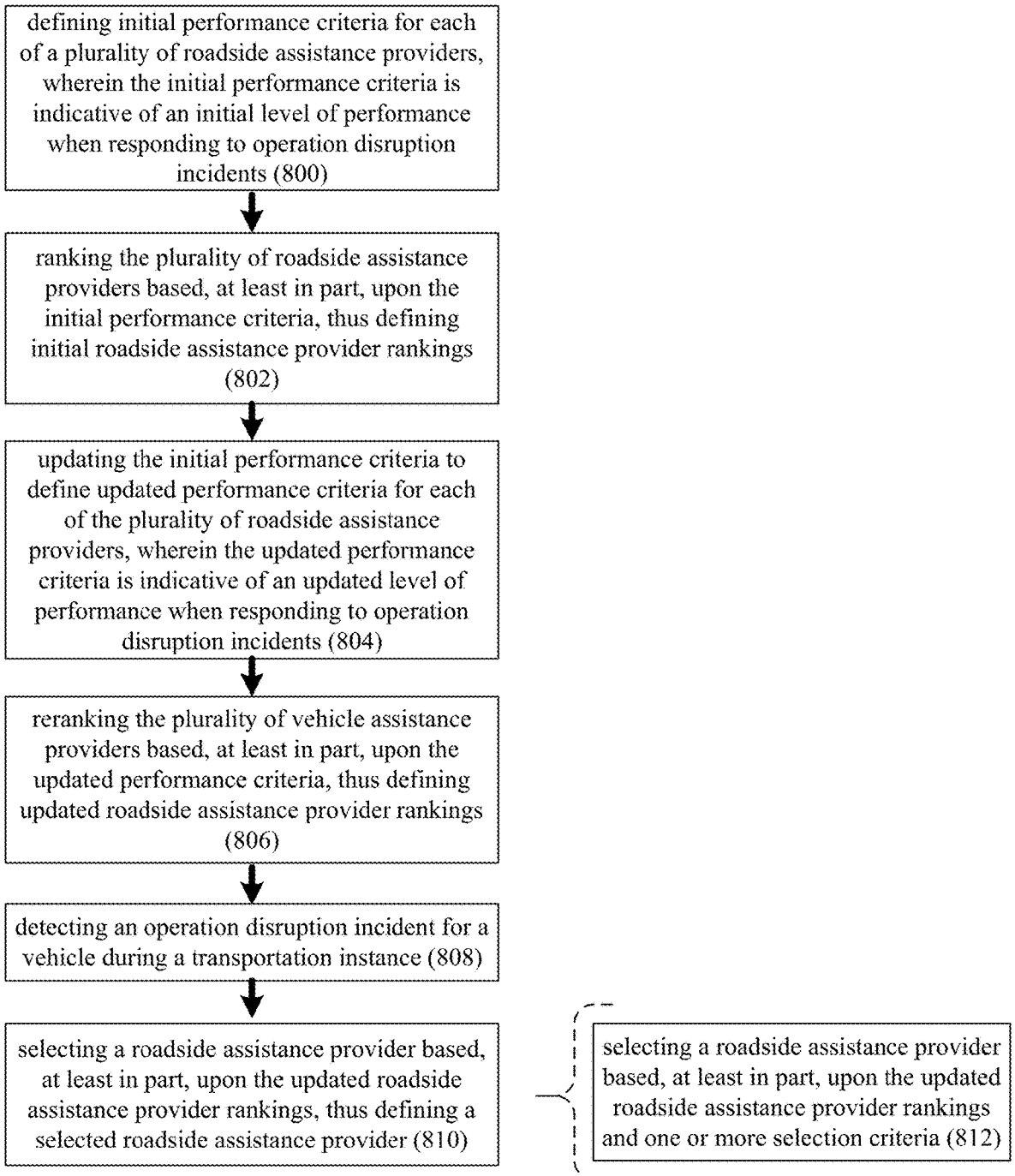
FIG. 8 is a flowchart of another implementation of the roadside assistance process of FIG. 1 according to an implementation of the present disclosure.

Referring also to FIG. 8, roadside assistance process 10 may define 800 initial performance criteria (e.g., initial performance criteria 230) for each of a plurality of roadside assistance providers (e.g., pool of roadside assistance providers 218), wherein the initial performance criteria (e.g., initial performance criteria 230) is indicative of an initial level of performance when responding to operation disruption incidents (e.g., operation disruption incident 210). As discussed above, examples of such an operation disruption incident (e.g., operation disruption incident 210) may include but are not limited to a vehicle failure incident.

The initial performance criteria (e.g., initial performance criteria 230) may include one or more of: customer reviews; response timeliness; quality of service rendered; cost of services; professionalism; and value of services rendered.

Customer Reviews: Customer reviews refer to feedback from individuals who have used the roadside assistance provider. These reviews typically reflect the customer's overall experience, including aspects like service quality, response time, professionalism, and cost. They can provide potential users with insights into the reliability and performance of the service based on real-world experiences.

Response Timeliness: Response timeliness is the measure of how quickly a roadside assistance provider responds to a service request. It includes the time taken from when a customer first contacts the provider to when a service technician arrives at the breakdown or incident location. In roadside assistance, quick response times are critical, especially in emergency situations or for stranded motorists.

Quality of Service Rendered: The quality of service rendered refers to the effectiveness and competence of the roadside assistance provider. It includes how well the provider handles the problem (e.g., tire change, battery jump-start, or towing), the tools and equipment used, and whether the issue is resolved efficiently and satisfactorily.

Cost of Services: The cost of services refers to the amount charged by the roadside assistance provider for rendering their services. This can include membership fees, per-service charges, or fees for additional services beyond basic assistance (like towing over a certain distance). Customers often weigh the cost of services against the quality and timeliness of the service received.

Professionalism: Professionalism refers to the behavior, attitude, and conduct of the roadside assistance provider. This includes how courteous and respectful they are to customers, their communication skills, how they present themselves (e.g., uniform, identification), and their adherence to safety and industry standards.

Value of Services Rendered: The value of services rendered is the perceived benefit a customer receives from the roadside assistance provider in relation to the cost they paid. It reflects whether customers feel they received fair and efficient service for the price charged, factoring in aspects like the timeliness, quality, professionalism, and overall customer experience.

Roadside assistance process 10 may rank 802 the plurality of roadside assistance providers (e.g., pool of roadside assistance providers 218) based, at least in part, upon the initial performance criteria (e.g., initial performance criteria 230), thus defining initial roadside assistance provider rankings (e.g., initial roadside assistance provider rankings 232).

Roadside assistance process 10 may update 804 the initial performance criteria (e.g., initial performance criteria 230) to define updated performance criteria (e.g., updated performance criteria 234) for each of the plurality of roadside assistance providers (e.g., pool of roadside assistance providers 218), wherein the updated performance criteria (e.g., updated performance criteria 234) is indicative of an updated level of performance when responding to operation disruption incidents (e.g., operation disruption incident 210).

This updated performance criteria (e.g., updated performance criteria 234) may include one or more of: customer reviews; response timeliness; quality of service rendered; cost of services; professionalism; and value of services rendered (as discussed above).

Roadside assistance process 10 may rerank 806 the plurality of vehicle assistance providers (e.g., pool of roadside assistance providers 218) based, at least in part, upon the updated performance criteria (e.g., updated performance criteria 234), thus defining updated roadside assistance provider rankings (e.g., updated roadside assistance provider rankings 236).

Roadside assistance process 10 may detect 808 an operation disruption incident (e.g., operation disruption incident 210) for a vehicle (e.g., vehicle 202) during a transportation instance (e.g., transportation instance 204). As discussed above, examples of such an operation disruption incident (e.g., operation disruption incident 210) may include but are not limited to a vehicle failure incident and/or a vehicle accident incident.

As discussed above, the transportation instance (e.g., transportation instance 204) may be all or a portion of a transportation route for the vehicle (e.g., vehicle 202), wherein the vehicle (e.g., vehicle 202) may be a commercial vehicle (e.g., a tractor-trailer, a delivery van, a box truck, a tanker truck, a flatbed truck, etc.). As discussed above, assume that the vehicle (e.g., vehicle 202) is a loaded tractor-trailer that is hauling a shipment of canned vegetables from Pittsburgh, Pennsylvania to Denver, Colorado. Accordingly, the transportation instance (e.g., transportation instance 204) may be all 1,447 miles of the trip from Pittsburgh PA to Denver, CO . . . or any portion thereof.

Roadside assistance process 10 may select 810 a roadside assistance provider based, at least in part, upon the updated roadside assistance provider rankings (e.g., updated roadside assistance provider rankings 236), thus defining a selected roadside assistance provider (e.g., selected roadside assistance provider 222). For this example, assume that roadside assistance provider 222 has a comparatively high rating of 4.6 stars, resulting in them topping the updated roadside assistance provider rankings (e.g., updated roadside assistance provider rankings 236).

When selecting 810 a roadside assistance provider based, at least in part, upon the updated roadside assistance provider rankings, roadside assistance process 10 may select 812 a roadside assistance provider based, at least in part, upon the updated roadside assistance provider rankings (e.g., updated roadside assistance provider rankings 236) and one or more selection criteria.

As discussed above, the one or more selection criteria may also include one or more of: a geographic location of the selected roadside assistance provider (e.g., selected roadside assistance provider 222); and a response time of the selected roadside assistance provider (e.g., selected roadside assistance provider 222). For this example, assume that selected roadside assistance provider 222 is only 10.6 miles from the geographic location (e.g., geographic location 226) of the operation disruption incident (e.g., operation disruption incident 210), thus enabling a comparatively quick response time.

The one or more selection criteria may also include instance information (e.g., instance information 206) regarding the transportation instance (e.g., transportation instance 204) of the vehicle (e.g., vehicle 202).

As also discussed above, the instance information (e.g., instance information 206) regarding the transportation instance (e.g., transportation instance 204) of the vehicle (e.g., vehicle 202) may include one or more of: size information concerning the vehicle (e.g., vehicle 202); type information concerning the vehicle (e.g., vehicle 202); weight information concerning the vehicle (e.g., vehicle 202); duration information for the transportation instance (e.g., transportation instance 204); velocity information for the vehicle (e.g., vehicle 202) during the transportation instance (e.g., transportation instance 204); current location information for the vehicle (e.g., vehicle 202) during the transportation instance (e.g., transportation instance 204); destination location information for the transportation instance (e.g., transportation instance 204); and starting location information for the transportation instance (e.g., transportation instance 204).

Some or all of the instance information (e.g., instance information 206) may be obtained from e.g., the driver (e.g., driver 200) of the vehicle (e.g., vehicle 202), a manifest associated with the vehicle (e.g., vehicle 202) and/or the transportation instance (e.g., transportation instance 204), a shipping company associated with the vehicle (e.g., vehicle 202) and/or the transportation instance (e.g., transportation instance 204), a dispatcher of the vehicle (e.g., vehicle 202), etc.

Concept 7—Driver Recommendations

Figure 9:
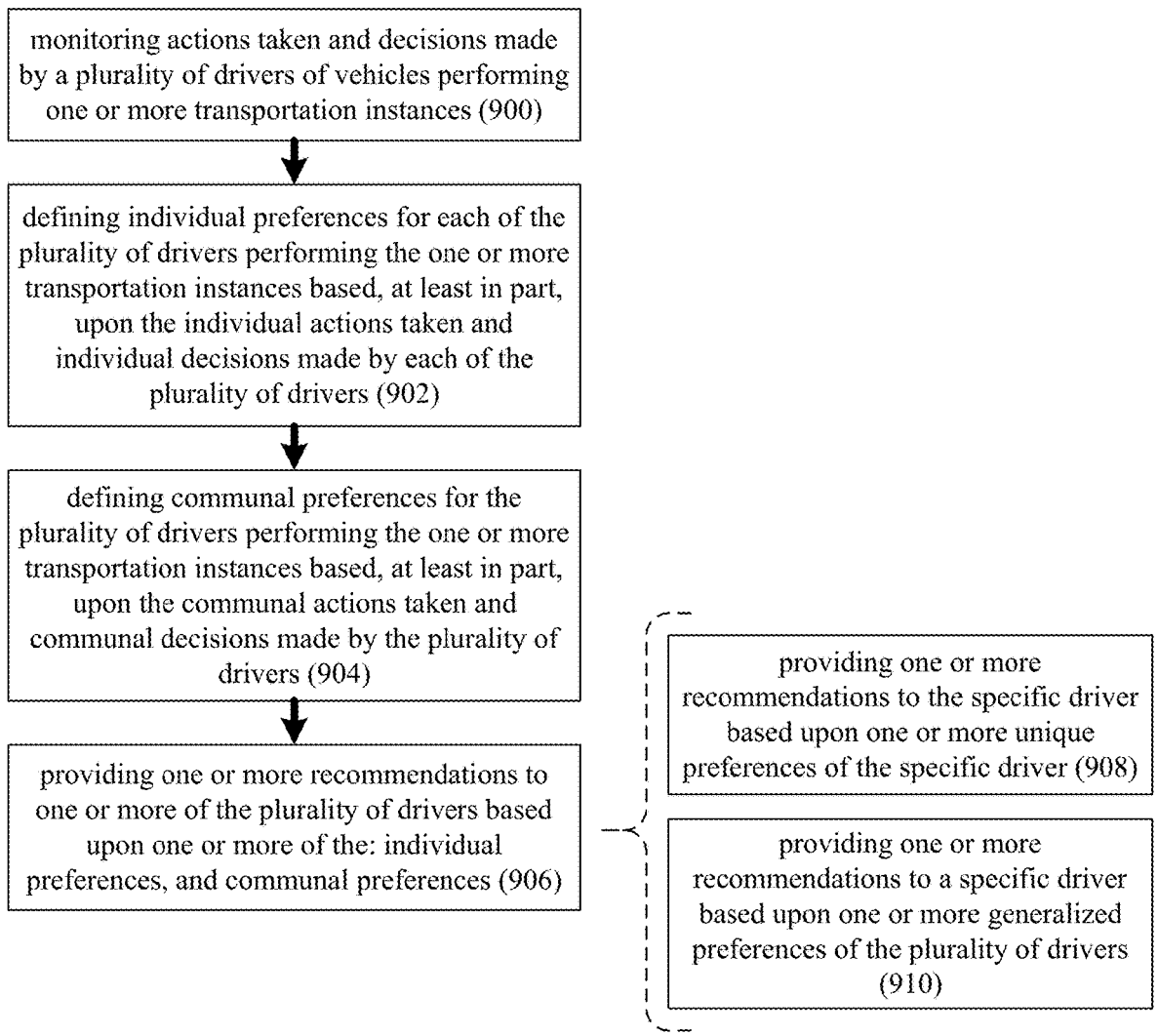
FIG. 9 is a flowchart of another implementation of the roadside assistance process of FIG. 1 according to an implementation of the present disclosure.

Referring also to FIG. 9, roadside assistance process 10 may monitor 900 actions taken and decisions made by a plurality of drivers (e.g., a plurality of drivers including driver 200) of vehicles (e.g., vehicle 202) performing one or more transportation instances (e.g., transportation instance 204).

As discussed above, the transportation instance (e.g., transportation instance 204) may be all or a portion of a transportation route for the vehicle (e.g., vehicle 202), wherein the vehicle (e.g., vehicle 202) may be a commercial vehicle (e.g., a tractor-trailer, a delivery van, a box truck, a tanker truck, a flatbed truck, etc.). As discussed above, assume that the vehicle (e.g., vehicle 202) is a loaded tractor-trailer that is hauling a shipment of canned vegetables from Pittsburgh, Pennsylvania to Denver, Colorado. Accordingly, the transportation instance (e.g., transportation instance 204) may be all 1,447 miles of the trip from Pittsburgh PA to Denver, CO . . . or any portion thereof.

The actions taken and the decisions made by the plurality of drivers (e.g., a plurality of drivers including driver 200) of vehicles (e.g., vehicle 202) performing one or more transportation instances (e.g., transportation instance 204) may include one or more of: vehicle weighing actions/decisions; vehicle washing actions/decisions; vehicle parking actions/decisions; vehicle fueling actions/decisions; vehicle maintenance actions/decisions; vehicle service actions/decisions; vehicle road assistance actions/decisions; driving route actions/decisions; toll actions/decisions; dining actions/decisions; accommodation actions/decisions; and shopping actions/decisions.

Vehicle Weighing Actions/Decisions: Such actions & decisions may concern vehicle weighing recommendations that identify the locations for weighing commercial vehicles.

Vehicle Washing Actions/Decisions: Such actions & decisions may concern vehicle washing recommendations that identify the locations for washing commercial vehicles.

Vehicle Parking Actions/Decisions: Such actions & decisions may concern vehicle parking recommendations that identify locations for safe and secure parking for commercial vehicles, particularly during rest breaks or overnight stays.

Vehicle Fueling Actions/Decisions: Such actions & decisions may concern vehicle fueling recommendations that identify the locations for fueling commercial vehicles.

Vehicle Maintenance Actions/Decisions: Such actions & decisions may concern vehicle maintenance recommendations that identify the locations for maintaining commercial vehicles.

Vehicle Service Actions/Decisions: Such actions & decisions may concern vehicle service recommendations that identify the locations for servicing commercial vehicles.

Vehicle Road Assistance Actions/Decisions: Such actions & decisions may concern vehicle road assistance recommendations that identify roadside assistance service providers.

Vehicle Route Actions/Decisions: Such actions & decisions may concern vehicle route recommendations that identify the desirable routes for commercial vehicles based upon road conditions, truck size restrictions, hazardous materials routes, fuel stops, tolls, and traffic patterns.

Toll Actions/Decisions: Such actions & decisions may concern vehicle route recommendations that identify routes that reduce/eliminate tolls for commercial vehicles.

Dining Actions/Decisions: Such actions & decisions may concern dining recommendations that identify safe and comfortable places for eating while on the road, such as truck stops and restaurants.

Accommodation Actions/Decisions: Such actions & decisions may concern accommodation recommendations that identify safe and comfortable places to rest overnight, such as motels, hotels, or designated truck rest areas that offer amenities such as truck parking, shower facilities, and discounted rates for commercial drivers.

Shopping Actions/Decisions: Such actions & decisions may concern shopping recommendations that identify locations in which truckers may purchase essential items like food, supplies, or vehicle parts while on the road.

Roadside assistance process 10 may define 902 individual preferences (e.g., individual preferences 238) for each of the plurality of drivers (e.g., a plurality of drivers including driver 200) performing the one or more transportation instances (e.g., transportation instance 204) based, at least in part, upon the individual actions taken and individual decisions made by each of the plurality of drivers (e.g., a plurality of drivers including driver 200).

Roadside assistance process 10 may define 904 communal preferences (e.g., communal preferences 240) for the plurality of drivers (e.g., a plurality of drivers including driver 200) performing the one or more transportation instances (e.g., transportation instance 204) based, at least in part, upon the communal actions taken and communal decisions made by the plurality of drivers (e.g., a plurality of drivers including driver 200).

Roadside assistance process 10 may provide 906 one or more recommendations (e.g., recommendations 242) to one or more of the plurality of drivers (e.g., a plurality of drivers including driver 200) based upon one or more of the: individual preferences (e.g., individual preferences 238) and communal preferences (e.g., communal preferences 240).

The one or more recommendations (e.g., recommendations 242) may include one or more of: vehicle weighing recommendations; vehicle washing recommendations; vehicle parking recommendations; vehicle fueling recommendations; vehicle maintenance recommendations; vehicle service recommendations; vehicle road assistance recommendations; driving route recommendations; toll recommendations; dining recommendations; accommodation recommendations; and shopping recommendations.

Vehicle Weighing Recommendations: Vehicle weighing recommendations may identify the locations for weighing commercial vehicles.

Vehicle Washing Recommendations: Vehicle washing recommendations may identify the locations for washing commercial vehicles.

Vehicle Parking Recommendations: Vehicle parking recommendations may identify locations for safe and secure parking for commercial vehicles, particularly during rest breaks or overnight stays.

Vehicle Fueling Recommendations: Vehicle fueling recommendations may identify the locations for fueling commercial vehicles.

Vehicle Maintenance Recommendations: Vehicle maintenance recommendations may identify the locations for maintaining commercial vehicles.

Vehicle Service Recommendations: Vehicle service recommendations may identify the locations for servicing commercial vehicles.

Vehicle Road Assistance Recommendations: Vehicle road assistance recommendations may identify roadside assistance service providers.

Driving Route Recommendations: Driving route recommendations may offer truckers guidance on selecting the most efficient and safe routes for transporting goods. These recommendations consider factors such as road conditions, truck size restrictions, hazardous materials routes, fuel stops, tolls, and traffic patterns.

Toll Recommendations: Toll recommendations may provide advice on managing tolls for commercial trucks, including routes that minimize toll costs, using electronic toll collection systems (like E-ZPass) to save time, and budgeting for toll expenses based on different regions and routes.

Dining Recommendations: Dining recommendations for commercial truckers may include suggestions on convenient and accessible places to eat while on the road. This might include truck stops, diners, or chains that provide parking for large vehicles.

Accommodation Recommendations: Accommodation recommendations may identify safe and comfortable places to rest overnight, such as motels, hotels, or designated truck rest areas that offer amenities such as truck parking, shower facilities, and discounted rates for commercial drivers.

Shopping Recommendations: Shopping recommendations may identify locations in which truckers may purchase essential items like food, supplies, or vehicle parts while on the road. This may include truck stops with retail shops, large chain stores with truck parking, or specialized stores catering to the needs of long-haul drivers.

These one or more recommendations (e.g., recommendations 242) may also include one or more of: instructions; directions; advertisements; announcements; coupons; and generalized recommendations.

Instructions: Such instructions may include instructions for commercial-driver-related issues.

Directions: Such directions may include directions to commercial-driver-friendly business establishments.

Advertisements: Such advertisements may include advertisements for commercial-driver-friendly business establishments.

Announcements: Such announcements may include announcements for commercial-driver-friendly business establishments.

Coupons: Such coupons may include coupons for commercial-driver-friendly business establishments.

Generalized Recommendations: Such generalized recommendations may include recommendations for commercial-driver-friendly issues.

The individual preferences (e.g., individual preferences 238) may include the unique preferences of a specific driver (e.g., driver 200) performing the one or more transportation instances (e.g., transportation instance 204).

Accordingly and when providing 906 one or more recommendations (e.g., recommendations 242) to one or more of the plurality of drivers (e.g., a plurality of drivers including driver 200) based upon one or more of the individual preferences (e.g., individual preferences 238) and communal preferences (e.g., communal preferences 240), roadside assistance process 10 may provide 908 one or more recommendations (e.g., recommendations 242) to the specific driver (e.g., driver 200) based upon one or more unique preferences (e.g., unique preferences 244) of the specific driver (e.g., driver 200).

These one or more unique preferences (e.g., unique preferences 244) of the specific driver (e.g., driver 200) may be based, at least in part, upon the actions taken and the decisions made by the specific driver (e.g., driver 200) performing one or more transportation instances (e.g., transportation instance 204), examples of which may include but are not limited to one or more of: vehicle weighing actions/decisions; vehicle washing actions/decisions; vehicle parking actions/decisions; vehicle fueling actions/decisions; vehicle maintenance actions/decisions; vehicle service actions/decisions; vehicle road assistance actions/decisions; driving route actions/decisions; toll actions/decisions; dining actions/decisions; accommodation actions/decisions; and shopping actions/decisions.

For example, assume that driver 200 is a fan of Denny's restaurants and being driver 200 has been moving for the past 8 hours, roadside assistance process 10 may realize that the driver is due for a break and are probably hungry. Further, assume that roadside assistance process 10 knows that a Denny's restaurant is 22 miles further along the transportation instance (e.g., transportation instance 204). Accordingly, roadside assistance process 10 may provide 908 one or more recommendations (e.g., recommendations 242) to the specific driver (e.g., driver 200) based upon the unique preferences (e.g., unique preferences 244) of driver 200. For example, roadside assistance process 10 may render a message on the display of the handheld electronic device (e.g., cellphone 208) carried by the driver (e.g., driver 200) within the vehicle (e.g., vehicle 202). An example of the message is as follows:

John, you have been driving for over 8 hours and are probably hungry. You seem to like Denny's restaurants and there is one 22 miles down I70. Would you like to go there?

In the event that driver 200 selects (or says) yes, roadside assistance process 10 may navigate driver 200 to this Denny's.

Additionally, the communal preferences (e.g., communal preferences 240) may include the generalized preferences of the plurality of drivers (e.g., a plurality of drivers including driver 200) performing the one or more transportation instances (e.g., transportation instance 204).

Further and when providing 906 one or more recommendations (e.g., recommendations 242) to one or more of the plurality of drivers (e.g., a plurality of drivers including driver 200) based upon one or more of the individual preferences (e.g., individual preferences 238) and communal preferences (e.g., communal preferences 240), roadside assistance process 10 may provide 910 one or more recommendations (e.g., recommendations 242) to a specific driver (e.g., driver 200) based upon one or more generalized preferences (e.g., generalized preferences 246) of the plurality of drivers (e.g., a plurality of drivers including driver 200).

These one or more generalized preferences (e.g., generalized preferences 246) of the plurality of drivers (e.g., a plurality of drivers including driver 200) may be based, at least in part, upon the actions taken and the decisions made by the plurality of drivers (e.g., a plurality of drivers including driver 200) performing one or more transportation instances (e.g., transportation instance 204), examples of which may include but are not limited to one or more of: vehicle weighing actions/decisions; vehicle washing actions/decisions; vehicle parking actions/decisions; vehicle fueling actions/decisions; vehicle maintenance actions/decisions; vehicle service actions/decisions; vehicle road assistance actions/decisions; driving route actions/decisions; toll actions/decisions; dining actions/decisions; accommodation actions/decisions; and shopping actions/decisions.

For example, assume (as discussed above) that driver 200 is a fan of Denny's restaurants and being driver 200 has been moving for the past 8 hours, roadside assistance process 10 may realize that the driver is due for a break and are probably hungry. And roadside assistance process 10 knows that driver 200 is a fan of Denny's restaurant. However, being this recommendation is based upon generalized preferences of the plurality of drivers (e.g., a plurality of drivers including driver 200), assume that ihop restaurants are rated more highly (at 4.8 stars) than Denny's restaurants (at 4.6 stars). Further, assume that roadside assistance process 10 knows that an ihop is 26 miles further along the transportation instance (e.g., transportation instance 204). Accordingly, roadside assistance process 10 may provide 910 one or more recommendations (e.g., recommendations 242) to the specific driver (e.g., driver 200) based upon the generalized preferences of the plurality of drivers (e.g., a plurality of drivers including driver 200). For example, roadside assistance process 10 may render a message on the display of the handheld electronic device (e.g., cellphone 208) carried by the driver (e.g., driver 200) within the vehicle (e.g., vehicle 202). An example of the message is as follows:

John, you have been driving for over 8 hours and are probably hungry. The community seems to like ihop restaurants and there is one 26 miles down I70. Would you like to go there?

In the event that driver 200 selects (or says) yes, roadside assistance process 10 may navigate driver 200 to this ihop.

General

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable legal research processing apparatus, such that the instructions, which execute via the processor of the computer or other programmable legal research processing apparatus, create means for implementing the functions/acts specified in the flowchart and/or block diagram block or blocks.

These computer program instructions may also be stored in a computer-readable memory that may direct a computer or other programmable legal research processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable legal research processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of implementations have been described. Having thus described the disclosure of the present application in detail and by reference to embodiments thereof, it will be apparent that modifications and variations are possible without departing from the scope of the disclosure defined in the appended claims.

What is claimed is:

1. A computer-implemented method, wherein the method comprises:

storing transportation instance information regarding a transportation instance of a vehicle, wherein the transportation instance information comprises: (i) duration information associated with the transportation instance, (ii) destination location information associated with the transportation instance, and (iii) starting location information associated with the transportation instance;

while the vehicle is engaged in the transportation instance, monitoring sensor data associated with the transportation instance and the vehicle, wherein the sensor data comprises (i) global positioning system (GPS) data associated with positions of the vehicle during the transportation instance, (ii) traffic data associated with one or more roadways between the starting location and the destination location of the transportation instance, (iii) acceleration data associated with acceleration of the vehicle, and (iv) velocity data associated with velocity of the vehicle;

determining whether the vehicle has experienced an operation disruption based at least in part on the sensor data, wherein determining whether the vehicle has experienced an operation disruption comprises distinguishing between whether the operation disruption is a mechanical failure or a traffic accident; and presenting, via a graphical user interface, one or more roadside assistance providers for responding to the operation disruption based at least in part on (i) geographic proximities of the one or more roadside assistance providers to a position of the operation disruption and (ii) a determination that one or more assistance capabilities of the one or more roadside assistance providers are sufficient for the operation disruption.

2. The computer-implemented method of claim 1 wherein the transportation instance information regarding the transportation instance of the vehicle further includes one or more of:
  type information concerning the vehicle;
  size information concerning the vehicle; and
  weight information concerning the vehicle.

3. The computer-implemented method of claim 1 wherein the transportation instance is all or a portion of a transportation route for the vehicle.

4. The computer-implemented method of claim 1 wherein the vehicle is one of a passenger car, a tractor-trailer, a delivery van, a box truck, a tanker truck, or a flatbed truck.

5. The computer-implemented method of claim 1, further comprising:
  receiving data associated with the one or more roadside assistance providers from a remote server system before presenting, via the graphical user interface, the one or more roadside assistance providers for responding to the operation disruption.

6. The computer-implemented method of claim 1 wherein distinguishing between whether the operation disruption is a mechanical failure or a traffic accident comprises:
  determining that the vehicle has experienced a mechanical failure when the velocity data indicates that the velocity of the vehicle is substantially zero while the vehicle is in a position along a roadway that is not experiencing traffic congestion; and
  determining that the vehicle has experienced a traffic accident when the acceleration data indicates that the vehicle has experienced a rate of deceleration above a deceleration threshold and the velocity data indicates that the velocity of the vehicle is substantially zero.

7. The computer-implemented method of claim 1 wherein the method further comprises:
  providing information associated with the operation disruption to the one or more roadside assistance providers;
  after providing the information associated with the operation disruption to the one or more roadside assistance providers, receiving data associated with one or more offers to respond to the operation disruption from the one or more roadside assistance providers; and
  after receiving the data associated with the one or more offers to respond to the operation disruption from the one or more roadside assistance providers, presenting via the graphical user interface, the one or more offers.

8. The computer-implemented method of claim 1 wherein the method further comprises:
  providing information associated with the operation disruption to a liability processor.

9. The computer-implemented method of claim 1 wherein the one or more roadside assistance providers includes one or more towing service providers.

10. The computer-implemented method of claim 1 wherein the one or more roadside assistance providers includes one or more emergency assistance providers.

11. A computer program product residing on a computer readable medium having a plurality of instructions stored thereon, wherein the instructions, when executed by one or more processors, cause a mobile computing device to perform operations comprising:
  storing transportation instance information regarding a transportation instance of a vehicle, wherein the transportation instance information comprises: (i) duration information associated with the transportation instance, (ii) destination location information associated with the transportation instance, and (iii) starting location information associated with the transportation instance;
  while the vehicle is engaged in the transportation instance, monitoring sensor data associated with the transportation instance and the vehicle, wherein the sensor data comprises (i) global positioning system (GPS) data associated with positions of the vehicle during the transportation instance, (ii) traffic data associated with one or more roadways between the starting location and the destination location of the transportation instance, (iii) acceleration data associated with acceleration of the vehicle, and (iv) velocity data associated with velocity of the vehicle;
  determining whether the vehicle has experienced an operation disruption based at least in part on the sensor data, wherein determining whether the vehicle has experienced an operation disruption comprises distinguishing between whether the operation disruption is a mechanical failure or a traffic accident; and
  presenting, via a graphical user interface, one or more roadside assistance providers for responding to the operation disruption based at least in part on (i) geographic proximities of the one or more roadside assistance providers to a position of the operation disruption and (ii) a determination that one or more assistance capabilities of the one or more roadside assistance providers are sufficient for the operation disruption.

12. The computer program product of claim 11 wherein the transportation instance information regarding the transportation instance of the vehicle further includes one or more of:
  type information concerning the vehicle;
  size information concerning the vehicle; and
  weight information concerning the vehicle.

13. The computer program product of claim 11 wherein the transportation instance is all or a portion of a transportation route for the vehicle.

14. The computer program product of claim 11 wherein the vehicle is one of a passenger car, a tractor-trailer, a delivery van, a box truck, a tanker truck, or a flatbed truck.

15. The computer program product of claim 11, further comprising:
receiving data associated with the one or more roadside assistance providers from a remote server system before presenting, via the graphical user interface, the one or more roadside assistance providers for responding to the operation disruption.

16. The computer program product of claim 11 wherein distinguishing between whether the operation disruption is a mechanical failure or a traffic accident comprises:
determining that the vehicle has experienced a mechanical failure when the velocity data indicates that the velocity of the vehicle is substantially zero while the vehicle is in a position along a roadway that is not experiencing traffic congestion; and
determining that the vehicle has experienced a traffic accident when the acceleration data indicates that the vehicle has experienced a rate of deceleration above a deceleration threshold and the velocity data indicates that the velocity of the vehicle is substantially zero.

17. The computer program product of claim 11 wherein the operations further comprise:
providing information associated with the operation disruption to the one or more roadside assistance providers;
after providing the information associated with the operation disruption to the one or more roadside assistance providers, receiving one or more offers to respond to the operation disruption from the one or more roadside assistance providers; and
after receiving the one or more offers to respond to the operation disruption from the one or more roadside assistance providers, presenting via the graphical user interface, the one or more offers.

18. The computer program product of claim 11 wherein the operations further comprise:
providing information associated with the operation disruption to a liability processor.

19. The computer program product of claim 11 wherein the one or more roadside assistance providers includes one or more towing service providers.

20. The computer program product of claim 11 wherein the one or more roadside assistance providers includes one or more emergency assistance providers.

21. A computing system including a processor and memory configured to perform operations comprising:
storing transportation instance information regarding a transportation instance of a vehicle, wherein the transportation instance information comprises: (i) duration information associated with the transportation instance, (ii) destination location information associated with the transportation instance, and (iii) starting location information associated with the transportation instance;
while the vehicle is engaged in the transportation instance, monitoring sensor data associated with the transportation instance and the vehicle, wherein the sensor data comprises (i) global positioning system (GPS) data associated with positions of the vehicle during the transportation instance, (ii) traffic data associated with one or more roadways between the starting location and the destination location of the transportation instance, (iii) acceleration data associated with acceleration of the vehicle, and (iv) velocity data associated with velocity of the vehicle;
determining whether the vehicle has experienced an operation disruption based at least in part on the sensor data, wherein determining whether the vehicle has experienced an operation disruption comprises distinguishing between whether the operation disruption is a mechanical failure or a traffic accident; and
presenting, via a graphical user interface, one or more roadside assistance providers for responding to the operation disruption based at least in part on (i) geographic proximities of the one or more roadside assistance providers to a position of the operation disruption and (ii) a determination that one or more assistance capabilities of the one or more roadside assistance providers are sufficient for the operation disruption.

22. The computing system of claim 21 wherein the transportation instance information regarding the transportation instance of the vehicle further includes one or more of:
type information concerning the vehicle;
size information concerning the vehicle; and
weight information concerning the vehicle.

23. The computing system of claim 21 wherein the transportation instance is all or a portion of a transportation route for the vehicle.

24. The computing system of claim 21 wherein the vehicle is one of a passenger car, a tractor-trailer, a delivery van, a box truck, a tanker truck, or a flatbed truck.

25. The computing system of claim 21 wherein the operations further comprise:
receiving data associated with the one or more roadside assistance providers from a remote server system before presenting, via the graphical user interface, the one or more roadside assistance providers for responding to the operation disruption.

26. The computing system of claim 21 wherein distinguishing between whether the operation disruption is a mechanical failure or a traffic accident comprises:
determining that the vehicle has experienced a mechanical failure when the velocity data indicates that the velocity of the vehicle is substantially zero while the vehicle is in a position along a roadway that is not experiencing traffic congestion; and
determining that the vehicle has experienced a traffic accident when the acceleration data indicates that the vehicle has experienced a rate of deceleration above a deceleration threshold and the velocity data indicates that the velocity of the vehicle is substantially zero.

27. The computing system of claim 21 wherein the operations further comprise:
providing information associated with the operation disruption to the one or more roadside assistance providers;
after providing the information associated with the operation disruption to the one or more roadside assistance providers, receiving one or more offers to respond to the operation disruption from the one or more roadside assistance providers; and
after receiving the one or more offers to respond to the operation disruption from the one or more roadside assistance providers, presenting via the graphical user interface, the one or more offers.

28. The computing system of claim 21 wherein the operations further comprise:
providing information associated with the operation disruption to a liability processor.

29. The computing system of claim 21 wherein the one or more roadside assistance providers includes one or more towing service providers.

30. The computing system of claim 21 wherein the one or more roadside assistance providers includes one or more emergency assistance providers.

* * * * *